United States Patent
Arataki et al.

[11] Patent Number: 6,052,346
[45] Date of Patent: Apr. 18, 2000

[54] METHODS AND APPARATUS FOR RECORDING DATA ON AND DELETING ALREADY RECORDED DATA FROM A RECORDING MEDIUM

[75] Inventors: Yuji Arataki, Tokyo; Hiroshi Yamaguchi, Chiba, both of Japan

[73] Assignee: Sony Corporation, Tokyo, Japan

[21] Appl. No.: 08/934,869

[22] Filed: Sep. 22, 1997

Related U.S. Application Data

[63] Continuation of application No. 08/742,958, Nov. 1, 1996, which is a continuation of application No. 08/422,121, Apr. 13, 1995, abandoned.

[30] Foreign Application Priority Data

Apr. 20, 1994 [JP] Japan .................................. 6-104358

[51] Int. Cl.[7] ...................................................... G11B 7/00
[52] U.S. Cl. .............................. 369/47; 369/32; 369/54
[58] Field of Search .............................. 369/47, 48, 59, 369/60, 54, 58, 124

[56] References Cited

U.S. PATENT DOCUMENTS

| | | | |
|---|---|---|---|
| 4,841,503 | 6/1989 | Yamada et al. | 369/14 |
| 4,932,016 | 6/1990 | Yoshida et al. | 369/48 |
| 5,124,963 | 6/1992 | Ando | 369/32 |
| 5,255,270 | 10/1993 | Yanai et al. | 371/10.2 |
| 5,295,124 | 3/1994 | Shirako | 369/32 |
| 5,311,492 | 5/1994 | Tabuchi et al. | 369/47 |
| 5,319,626 | 6/1994 | Ozaki et al. | 369/54 |
| 5,319,628 | 6/1994 | Stas et al. | 369/54 |
| 5,331,617 | 7/1994 | Fuma et al. | 369/54 |
| 5,343,451 | 8/1994 | Iizuka | 369/32 |
| 5,345,433 | 9/1994 | Ohga et al. | 369/54 |
| 5,363,362 | 11/1994 | Maeda et al. | 369/54 |
| 5,377,167 | 12/1994 | Maeda et al. | 369/47 |
| 5,392,265 | 2/1995 | Takezawa | 369/32 |
| 5,420,838 | 5/1995 | Maeda et al. | 369/54 |
| 5,426,624 | 6/1995 | Goto | 369/54 |
| 5,432,768 | 7/1995 | Terashima et al. | 369/58 |

(List continued on next page.)

FOREIGN PATENT DOCUMENTS

| | | |
|---|---|---|
| 0288571 A1 | 11/1988 | European Pat. Off. . |
| 0333165 A2 | 9/1989 | European Pat. Off. . |
| 0448378 A2 | 9/1991 | European Pat. Off. . |
| 0511633 A2 | 11/1992 | European Pat. Off. . |
| 0543446 A1 | 5/1993 | European Pat. Off. . |
| 0584834 A2 | 3/1994 | European Pat. Off. . |
| 0586189 A2 | 3/1994 | European Pat. Off. . |
| 4-114384 | 4/1992 | Japan . |

OTHER PUBLICATIONS

Patent Abstracts of Japan, vol. 10, No. 358 (P–522), JP 61–153875, Published Jul. 12, 1986, Canon Inc.
Patent Abstracts of Japan, vol. 17, No. 471 (P–1601), JP 5–109074, Published Apr. 30, 1993, Pioneer Electron Corp.

*Primary Examiner*—Nabil Hindi
*Attorney, Agent, or Firm*—Limbach & Limbach L.L.P.

[57] ABSTRACT

In a recording method for a recording medium having a data recording area on which a data recording and/or reproducing operation is carried out, and a management data area on which management data to manage a recording and/or reproducing operation for the recording medium are recorded, when new data are recorded on the recording medium in a state where data have been already recorded on the recording medium and a data-recordable area on which the new data can be recorded exists on the data recording area, the recording operation of the new data is started from the head position of the data-recordable area on the basis of the management data recorded on the management data area, and data which have been already recorded on the recording medium are deleted by the same data amount as the new data to be recorded on the data-recordable area from a position on the data recording area of the recording medium at which the recording operation is instructed to start.

5 Claims, 17 Drawing Sheets

U.S. PATENT DOCUMENTS

| | | | |
|---|---|---|---|
| 5,473,590 | 12/1995 | Yokota et al. | 369/59 |
| 5,485,448 | 1/1996 | Kishi et al. | 369/54 |
| 5,487,047 | 1/1996 | Oka | 369/32 |
| 5,508,984 | 4/1996 | Goto | 369/47 |
| 5,513,162 | 4/1996 | Kishi et al. | 369/291 |
| 5,519,681 | 5/1996 | Maeda et al. | 369/59 |
| 5,541,902 | 7/1996 | Ten Kate | 369/54 |
| 5,553,048 | 9/1996 | Maeda | 369/60 |
| 5,555,229 | 9/1996 | Kojima et al. | 369/60 |
| 5,559,780 | 9/1996 | Maeda et al. | 369/54 |
| 5,561,644 | 10/1996 | Kondo | 369/32 |
| 5,610,888 | 3/1997 | Hiranuma | 369/54 |
| 5,638,346 | 6/1997 | Aramaki | 369/32 |
| 5,659,528 | 8/1997 | Kojima et al. | 369/60 |
| 5,764,607 | 6/1998 | Maeda et al. | 369/47 |
| 5,799,212 | 8/1998 | Ohmori | 369/48 |

INNER PERIPHERAL SIDE OF DISK ←   OUTER PERIPHERAL SIDE OF DISK →

RECORDING START OPERATION

RECORDING

FIG.5

| | 16bit | | 16bit | | |
|---|---|---|---|---|---|
| | MSB LSB | MSB LSB | MSB LSB | MSB LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | "M" | "I" | "N" | "I" | 6 |
| | Disc type | Rec power | First TNO | Last TNO | 7 |
| | READ-OUT START ADDRESS (RO$_A$) | | | Used Sectors | 8 |
| | POWER CALL AREA START ADDRESS (PC$_A$) | | | 00000000 | 9 |
| | U-TOC START ADDRESS (UST$_A$) | | | 00000000 | 10 |
| | RECORDABLE USER AREA START ADDRESS (RST$_A$) | | | 00000000 | 11 |
| CORRESPONDING TABLE INDICATING DATA PORTION { | 00000000 | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| MANAGEMENT TABLE PORTION (255 PART TABLE) { (01h) | START ADDRESS | | | TRACK MODE | 78 |
| | END ADDRESS | | | 00000000 | 79 |
| (02h) | START ADDRESS | | | TRACK MODE | 80 |
| | END ADDRESS | | | 00000000 | 81 |
| (03h) | START ADDRESS | | | TRACK MODE | 82 |
| | END ADDRESS | | | 00000000 | 83 |
| (FCh) | START ADDRESS | | | TRACK MODE | 580 |
| | END ADDRESS | | | 00000000 | 581 |
| (FDh) | START ADDRESS | | | TRACK MODE | 582 |
| | END ADDRESS | | | 00000000 | 583 |
| (FEh) | START ADDRESS | | | TRACK MODE | 584 |
| | END ADDRESS | | | 00000000 | 585 |
| (FFh) | START ADDRESS | | | TRACK MODE | 586 |
| | END ADDRESS | | | 00000000 | 587 |

P-TOC SECTOR-0

FIG.6

| | 16bit | | 16bit | | |
|---|---|---|---|---|---|
| | MSB LSB | MSB LSB | MSB LSB | MSB LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disk Serial No. | 10 |
| | Disc | ID | P-DFA | P-EMPTY | 11 |
| CORRESPONDING TABLE INDICATING DATA PORTION { | P-FRA | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| MANAGEMENT TABLE PORTION (255 PART TABLE) (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

U-TOC SECTOR-0

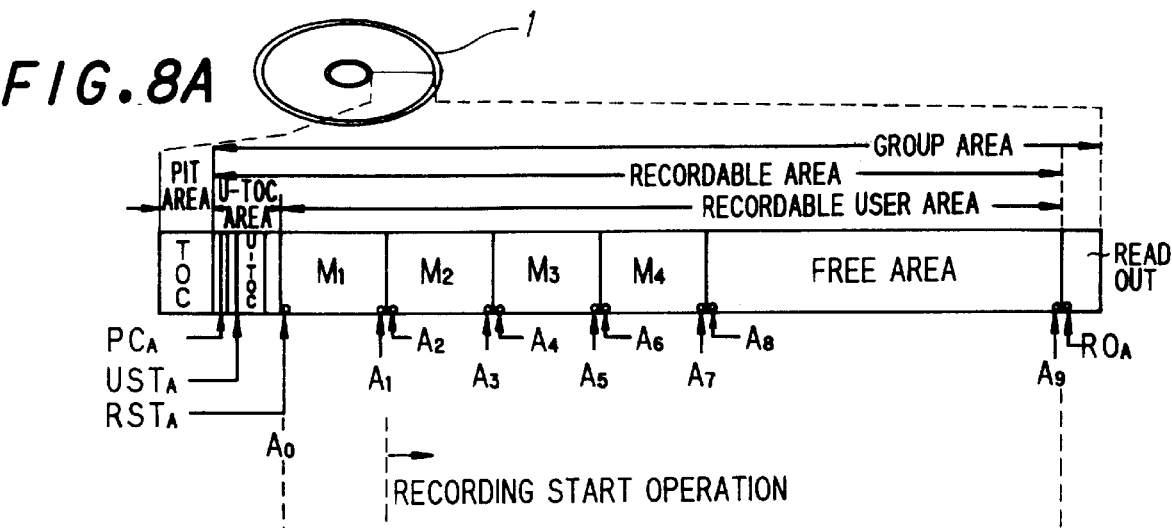
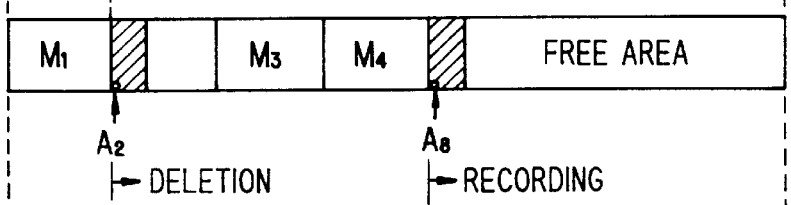
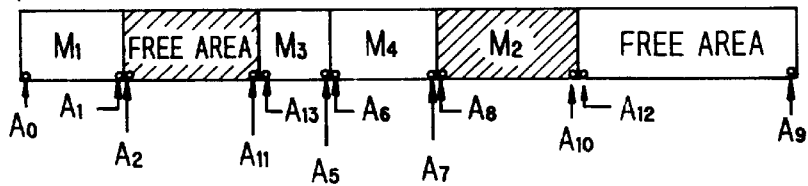
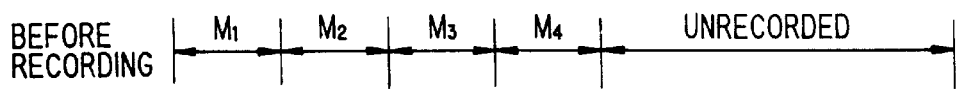
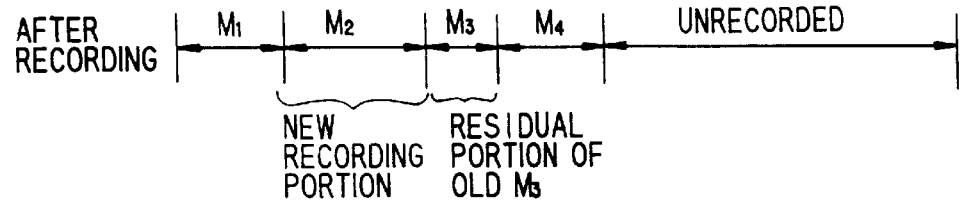

FIG. 10

CORRESPONDING TABLE INDICATING DATA PORTION (TABLE POINTER)

| P-DFA:00h | P-EMPTY:(06h) | P-FRA:(05h) |
|---|---|---|
| P-TN01:(01h) | P-TN02:(02h) | P-TN03:(03h) |
| P-TN04:(04h) | P-TN05:00h | P-TN06:00h |
| P-TN07:00h | P-TN08:00h | P-TN09:00h |
| P-TN0253:00h | P-TN0254:00h | P-TN0255:00h |

MANAGEMENT TABLE PORTION (255 PART TABLE)

| | START ADDRESS | END ADDRESS | TRACK MODE | LINK INFORMATION | |
|---|---|---|---|---|---|
| (01h) | $A_0$ | $A_1$ | | 00h | $M_1$ |
| (02h) | $A_2$ | $A_1$ | | 00h | $M_2$ |
| (03h) | $A_4$ | $A_5$ | | 00h | $M_3$ |
| (04h) | $A_6$ | $A_7$ | | 00h | $M_4$ |
| (05h) | $A_8$ | $A_9$ | | 00h | FREE AREA |
| (06h) | 00h | 00h | | (07h) | |
| (07h) | 00h | 00h | | (08h) | |
| (08h) | 00h | 00h | | (09h) | |
| (09h) | 00h | 00h | | (0Ah) | |
| (0Ah) | 00h | 00h | | (0Bh) | |
| (0Bh) | 00h | 00h | | (0Ch) | |
| (FEh) | 00h | 00h | | (FFh) | |
| (FFh) | 00h | 00h | | 00h | |

FIG. 11

CORRESPONDING TABLE INDICATING DATA PORTION (TABLE POINTER)

| P-DFA:00h | P-EMPTY:(02h) | P-FRA:(05h) |
|---|---|---|
| P-TN01:(01h) | P-TN02:(06h) | P-TN03:(03h) |
| P-TN04:(04h) | P-TN05:00h | P-TN06:00h |
| P-TN07:00h | P-TN08:00h | P-TN09:00h |
| P-TN0253:00h | P-TN0254:00h | P-TN0255:00h |

MANAGEMENT TABLE PORTION (255 PART TABLE)

| | START ADDRESS | END ADDRESS | TRACK MODE | LINK INFORMATION | |
|---|---|---|---|---|---|
| (01h) | $A_0$ | $A_1$ | | 00h | $M_1$ |
| (02h) | 00h | 00h | | (08h) | |
| (03h) | $A_{13}$ | $A_5$ | | 00h | $M_3$ |
| (04h) | $A_6$ | $A_7$ | | 00h | $M_4$ |
| (05h) | $A_{12}$ | $A_9$ | | (07h) | FREE AREA |
| (06h) | $A_8$ | $A_{10}$ | | 00h | $M_2$ |
| (07h) | $A_2$ | $A_{11}$ | | 00h | FREE AREA |
| (08h) | 00h | 00h | | (09h) | |
| (09h) | 00h | 00h | | (0Ah) | |
| (0Ah) | 00h | 00h | | (0Bh) | |
| (0Bh) | 00h | 00h | | (0Ch) | |
| (FEh) | 00h | 00h | | (FFh) | |
| (FFh) | 00h | 00h | | 00h | |

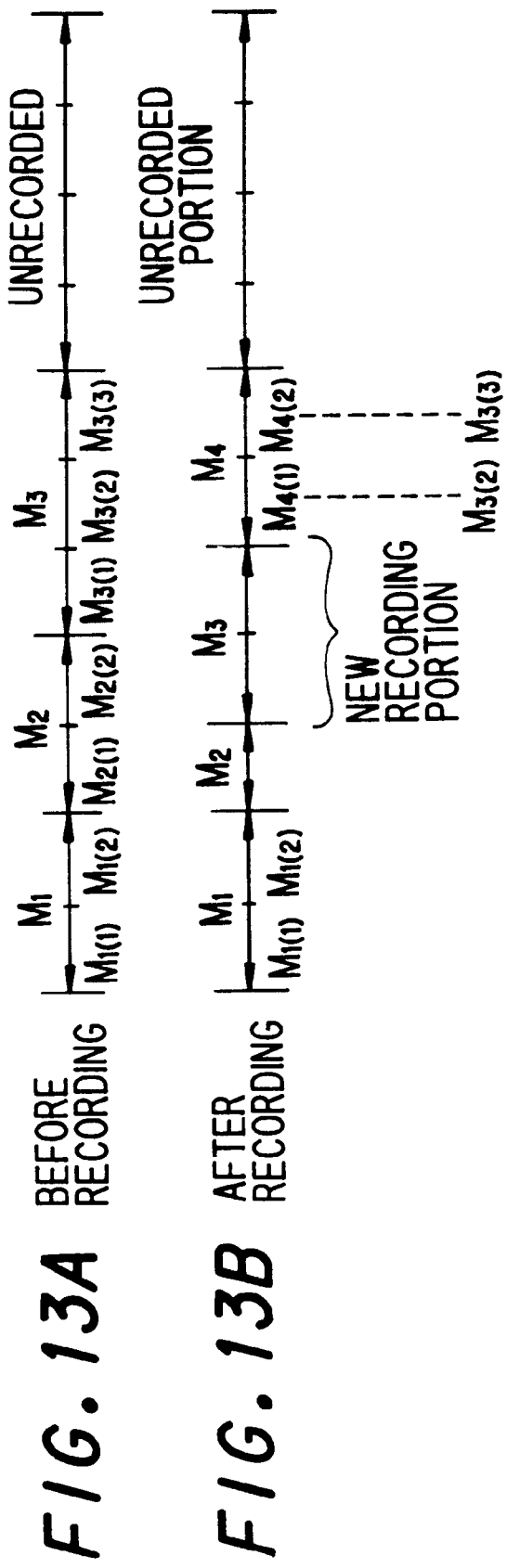

FIG. 14

CORRESPONDING TABLE INDICATING DATA PORTION (TABLE POINTER)

| P-DFA:00h | P-EMPTY:(0Bh) | P-FRA:(08h) |
|---|---|---|
| P-TNO:(01h) | P-TNO2:(04h) | P-TNO3:(05h) |
| P-TNO4:(04h) | P-TNO5:00h | P-TNO6:00h |
| P-TNO7:00h | P-TNO8:00h | P-TNO9:00h |
| P-TNO253:00h | P-TNO254:00h | P-TNO255:C0h |

MANAGEMENT TABLE PORTION (255 PART TABLE)

| | START ADDRESS | END ADDRESS | TRACK MODE | LINK INFORMATION | |
|---|---|---|---|---|---|
| (01h) | $A_{27}$ | $A_{28}$ | | (03h) | $M_{1(1)}$ |
| (02h) | $A_{29}$ | $A_{30}$ | | 00h | $M_{2(2)}$ |
| (03h) | $A_{37}$ | $A_{38}$ | | 00h | $M_{1(2)}$ |
| (04h) | $A_{23}$ | $A_{24}$ | | (02h) | $M_{2(1)}$ |
| (05h) | $A_{25}$ | $A_{26}$ | | (06h) | $M_{3(1)}$ |
| (06h) | $A_{21}$ | $A_{22}$ | | (07h) | $M_{3(2)}$ |
| (07h) | $A_{33}$ | $A_{34}$ | | 00h | $M_{3(3)}$ |
| (08h) | $A_{39}$ | $A_{40}$ | | (09h) | FREE AREA |
| (09h) | $A_{31}$ | $A_{32}$ | | (0Ah) | FREE AREA |
| (0Ah) | $A_{35}$ | $A_{36}$ | | 00h | FREE AREA |
| (0Bh) | 00h | 00h | | (0Ch) | |
| (FEh) | 00h | 00h | | (FFh) | |
| (FFh) | 00h | 00h | | 00h | |

FIG. 15

CORRESPONDING TABLE INDICATING DATA PORTION (TABLE POINTER)

| P-DFA:00h | P-EMPTY:(0Bh) | P-FRA:(09h) |
|---|---|---|
| P-TN0:(01h) | P-TN02:(04h) | P-TN03:(08h) |
| P-TN04:(06h) | P-TN05:00h | P-TN06:00h |
| P-TN07:00h | P-TN08:00h | P-TN09:00h |
| P-TN0253:00h | P-TN0254:00h | P-TN0255:00h |

MANAGEMENT TABLE PORTION (255 PART TABLE)

| | START ADDRESS | END ADDRESS | TRACK MODE | LINK INFORMATION | |
|---|---|---|---|---|---|
| (01h) | $A_{27}$ | $A_{28}$ | | (03h) | $M_{1(1)}$ |
| (02h) | $A_{29}$ | $A_{30}$ | | 05h | FREE AREA |
| (03h) | $A_{37}$ | $A_{38}$ | | 00h | $M_{1(2)}$ |
| (04h) | $A_{23}$ | $A_{24}$ | | 00h | $M_2$ |
| (05h) | $A_{25}$ | $A_{26}$ | | 00h | FREE AREA |
| (06h) | $A_{21}$ | $A_{22}$ | | (07h) | $M_{4(1)}$ |
| (07h) | $A_{33}$ | $A_{34}$ | | 00h | $M_{4(2)}$ |
| (08h) | $A_{39}$ | $A_{40}$ | | 00h | $M_3$ |
| (09h) | $A_{31}$ | $A_{32}$ | | (0Ah) | FREE AREA |
| (0Ah) | $A_{35}$ | $A_{36}$ | | (02h) | FREE AREA |
| (0Bh) | 00h | 00h | | (0Ch) | |
| (FEh) | 00h | 00h | | (FFh) | |
| (FFh) | 00h | 00h | | 00h | |

FIG. 17A
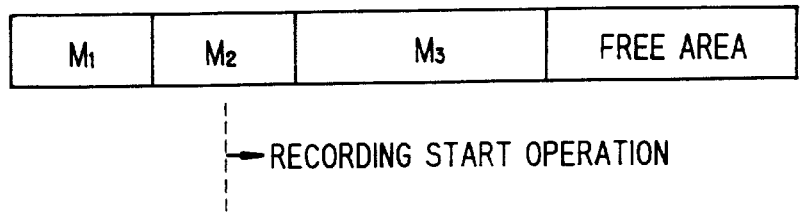
FIG. 17B
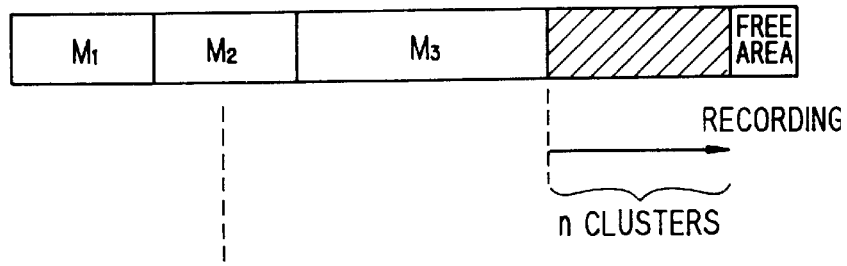
FIG. 17C
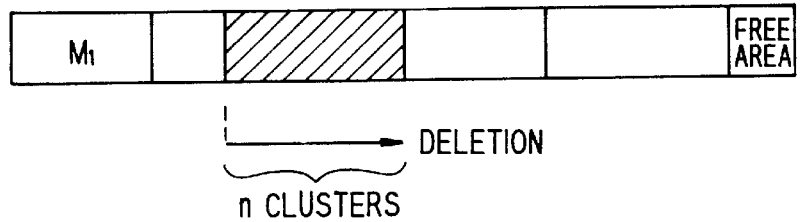
FIG. 17D
FIG. 18A BEFORE RECORDING
FIG. 18B AFTER RECORDING
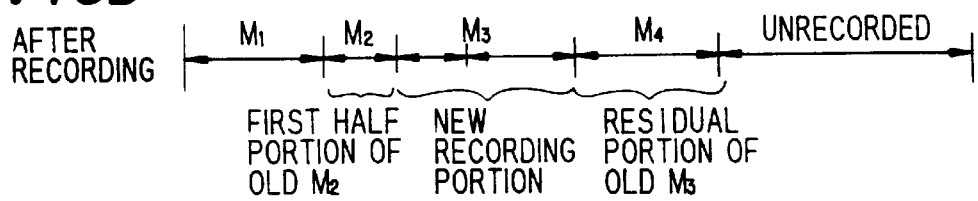

METHODS AND APPARATUS FOR RECORDING DATA ON AND DELETING ALREADY RECORDED DATA FROM A RECORDING MEDIUM

This is a continuation of application Ser. No. 08/742,958, filed Nov. 1, 1996 pending, which is a continuation of application Ser. No. 08/422,121 filed Apr. 13, 1995, now abandoned.

BACKGROUND

1. Field of the Invention

The present invention relates to a recording method and a recording apparatus for a recording medium. More particularly, the present invention relates to a recording method and a recording apparatus for a recording medium having management data to manage a data recording and/or reproducing operation.

2. Background of the Invention

A disc-shaped data rewritable recording medium on which an user can freely record music data or the like has been hitherto known. This type of disc-shaped recording medium (hereinafter referred to as "disc") is provided with a data area on which music data of pieces of music have been already recorded, and a data area (user's Table Of Contents, hereinafter referred to as "U-TOC") on which management data to manage unrecorded areas having no data recorded therein are recorded. The disc is designed so that the management data are also rewritten in accordance with various operations such as a recording operation, an editing operation, a deleting operation, etc., for example.

For example, when a piece of music is recorded, a recording device searches a non-recording area on the disc on the basis of the management data in the U-TOC to record audio data in the searched non-recording area. On the other hand, a reproducing device searches from the U-TOC an area on which a piece of music (track) to be reproduced is recorded, and accesses the area to perform a reproducing operation.

A data recordable disc such as a magneto-optical disc has an advantage that a random access can be more easily performed as compared with a tape-shaped recording medium such as a DAT (digital audio tape), a compact cassette tape or the like. Accordingly, it is unnecessary to record music data (plural pieces of music) from the inner peripheral side to the outer peripheral side on the disc so that the respective music data are orderly arranged from a first track until an n-th track in this order. That is, even when the respective pieces of music are physically randomly recorded on the disc, the pieces of music can be orderly reproduced insofar as addresses from the first track to the n-th track at which the respective pieces of music are recorded are managed by the U-TOC as described above or the like. In the following description, one piece of music is assumed to be recorded on one track, however, one piece of music may be recorded over plural tracks or on a part of one track.

Furthermore, each piece of music (track) is not necessarily recorded as a lump on a continuous part (hereinafter, the term of "part" means a part on which physically-continuous data are recorded), and it may be discretely recorded on plural parts while divided into plural sub pieces of music (sub music data).

Particularly in a system for temporarily storing data read out from a magneto-optical disc into a buffer memory at a high transfer rate, then reading out the data from the buffer memory at a low transfer rate to obtain audio reproduction signals, and then conducting a decoding processing on the audio reproduction signals, the reproduction audio signals can be output without interruption even when the data read-out operation from the magneto-optical disc is temporarily intercepted due to access shift between parts.

Accordingly, by repeating a recording and reproducing operation and a high-speed access operation (an access operation which is finished within a reproducible time in accordance with a data accumulation amount which is dependent on the difference between a data writing rate into the buffer memory and a data reading rate from the buffer memory, the recording/reproducing operation of the pieces of music can be performed with no trouble even when the music datum of a piece of music is physically divided into plural sub music data and discretely recorded on the disc.

For example, a data recording format as shown in FIG. 1 may be adopted. In this data recording format, each of first and second pieces of music is physically continuously recorded on a part (for example, the first and second pieces of music are recorded on a part $M_1$ and a part $M_2$ respectively) while each of fourth and fifth pieces of music is discretely recorded on plural parts with being physically divided into plural sub music data (for example, the fourth piece of music is divisionally recorded on sub parts $M_{4(1)}$ to $M_{4(4)}$ and the fifth piece of music is also divisionally recorded on sub parts $M_{5(1)}$ to $M_{5(2)}$. FIG. 1 shows the recording format more schematically, and practically one part may extend over several to several hundreds rounds (tracks) or more.

When the music data recording or deleting operation is repetitively performed on the magneto-optical disc, empty areas occurs irregularly on the disc due to the difference in music rendering time between pieces of music to be recorded or between pieces of music to be deleted. However, with the data discrete recording operation as described above, for example, a piece of music which is longer than a deleted piece of music can be partially or wholly recorded on a part on which the deleted piece of music was recorded, so that the data recording area can be effectively used (occurrence of vain data recording areas can be suppressed) by repeating the data recording/deleting operation. The data to be recorded on the disc are not limited to "pieces of music (musical data)", and any data may be recorded insofar as these data are audio (sound) signals. In the following description, it is assumed that a piece of music is recorded as an unit data (track) whose content is continuous.

Of course, it is required that the data recording operation on such a disc is continued while accessing plural parts serving as non-recording areas, and the data reproducing operation from the disc is performed while accessing plural parts so that each piece of music is reproduced accurately continuously. In order to satisfy this requirement, data for linking parts for each piece of music, for example, the parts $M_{4(1)}$ to $M_{4(4)}$ shown in FIG. 1, and data indicating non-recording areas are held as management data in the U-TOC which is rewritten every recording operation or deleting operation as described above. Accordingly, the recording and/or reproducing apparatus is controlled to read in the management data from the U-TOC to access the head of the data, whereby a proper recording/reproducing operation is performed.

FIG. 2 shows a data recording format on the disc. As shown in FIG. 2, the recording data on the disc are blocked (sectioned) on a cluster basis. One cluster CL (=36 sectors) contains a sub data area of four sectors (1 sector=2352 bytes)

and a main data area of 32 sectors, and one cluster is the minimum unit for recording. One cluster corresponds to a track of two to three rounds. An address is recorded every sector.

The sub data area of four sectors is used for sub data or as a linking area, and the management data, audio data, etc. are recorded on the main data area of 32 sectors.

One sector is further divided into sound groups (not shown), and two sectors are divided into 11 sound groups. Data of 512 samples are recorded in a sound group while shared to an L-channel and an R-channel. Each sound group has an audio data amount corresponding to a time of 11.6 msec.

There have been utilized two recording methods when an user records pieces of music, voices or the like using a disc system using a buffer memory as described above. In one recording method, a non-recording area on which no data are recorded (hereinafter referred to as "free area") is automatically searched, and the recording operation is performed on the searched free area. On the other hand, in the other recording method, the deletion of past data is started from a portion on which a recording start operation is conducted, that is, a so-called overwrite recording operation is performed. In this specification, the term "past data" means data to be deleted or disused.

The data overwrite recording operation will be described below with reference to FIGS. 3A to 3D. In this case, it is assumed that four pieces of music (music data $M_1$ to $M_4$) have been recorded on a disc as shown in FIG. 3A.

The data overwrite operation is performed, for example, in a case where an user starts the recording operation in an overwritable mode at the time when the reproduction of the first piece of music (first music data $M_1$) is finished and the reproduction of the second piece of music (second music data $M_2$) is about to start, or in a case where the head position of the second piece of music $M_2$ is accessed to temporarily stop the reproducing operation of the second piece of music (second music data $M_2$) and the recording operation is started in an overwritable mode. These cases correspond to a case where an user wants to delete the music data of the second piece of music and record the music data of a new piece of music, for example. That is, through this overwrite operation, a past piece of music on the disc is deleted in the same manner as that on a compact cassette tape, and a new piece of music is recorded on the deleted piece of music. In this specification, "past piece of music" means a piece of music to be deleted or disused.

Through this operation, in the disc system as described above, the head position of the second piece of music (second music data $M_2$) and the subsequent portion thereof are wholly deleted and set to a free area as shown in FIG. 3B. Thereafter, the recording operation of actual data of a new second piece of music (new second music data $M_2$) is started from the head position of the free area as shown in FIG. 3C. When a recording stop operation is performed at a time, the recording operation of the new second piece of music (new second music data $M_2$) is completed.

However, the overwrite recording method as described above has a problem that those data which are still needed by the user may be unintentionally deleted because the whole portion subsequent to the recording start point is deleted. For example, even when the user newly records a piece of music whose rendition is finished within the total time of the pieces of music (music data $M_2$ and $M_3$) in FIGS. 3A to 3D because he wants to leave the fourth piece of music, the piece of music (music data $M_4$) is deleted against his intention. If the user is familiar with the operation of the disc system, he would understand that the piece of music (music data $M_4$) is deleted. However, if the user is familiar with the recording operation for a compact cassette tape, but unfamiliar with the disc system, he would operate the disc system in the same manner as the compact cassette tape, so that the above problem is liable to occur.

Furthermore, in a case where the user is familiar with the operation of the disc system and wants to delete the pieces of music (music data $M_2$ and $M_3$) while leaving the piece of music (music data $M_4$) and overwrite a new piece of music on the deleted pieces of music (music data $M_2$ and $M_3$), the music data $M_4$ is temporarily altered to the music data $M_2$ by performing a music order changing edition, and then the recording is started from the head position of the music data $M_3$. Therefore, the overwrite recording operation itself becomes cumbersome.

Still furthermore, the actual recording operation is not started just when the recording operation is instructed because an editing operation of setting the recording start point and the subsequent portion thereto as a free area must be performed before the recording operation is started. Therefore, it takes some time to start the actual recording operation.

SUMMARY OF THE INVENTION

It is therefore an object of the present invention to provide a recording method of a recording medium which resolves the above-mentioned problem.

It is another object of the present invention to provide a recording apparatus of a recording medium which resolves the above-mentioned problem.

According to the present invention, there is provided a recording method for a recording medium having a data recording area on which a data recording and/or reproducing operation is carried out, and a management data area on which management data for managing a recording and/or reproducing operation for the recording medium are recorded. The recording method is characterized in that when new data are required to be recorded on the recording medium in a state where data have been already recorded on the recording medium and a data recordable (data unrecorded) area exists on the data recording area, the recording operation of the new data is started from the head position of the recordable area on the basis of the management data recorded on the management data area, and those data which have been already recorded (hereinafter referred to as "already-recorded data") are deleted by the same data amount as the new data to be recorded on the data recordable area from a position on the data recording area of the recording medium at which the recording operation of the new data is instructed to start.

According to the present invention, there is provided a recording method for a recording medium which has a data recording area on which a data recording and/or reproducing operation is carried out, and a management data area on which management data for managing a recording and/or reproducing operation for the recording medium are recorded, and on which address data are recorded. Data are sectioned into plural blocks every predetermined amount of data as a recording unit, and recorded on plural blocks of the data recording area. On the management data area are recorded data indicating a read-out order of the plural blocks. The recording method is characterized in that when new data are required to be recorded on the recording medium in a state where data which are sectioned into plural blocks have been already recorded on the recording medium and a data recordable (data unrecorded) area exists on the data recording area, the recording operation of the new data is started from the head position of the recordable area on the basis of the management data of the management data area, data which have been already recorded are deleted by the same data amount as the new data to be recorded on the data recordable area from the position on the data recording area of the recording medium at which the recording operation of the new data is instructed to start, and the data indicating the data read-out order on the management data area are rewritten.

According to the present invention, there is provided a recording apparatus for a recording medium which has a data recording area on which a data recording and/or reproducing operation is carried out, and a management data area on which management data for managing a recording and/or reproducing operation for the recording medium are recorded, and on which address data are recorded. Data are sectioned into plural blocks every predetermined amount of data as a recording unit, and recorded on plural blocks of the data recording area. On the management data area are recorded data indicating a read-out order of the plural blocks. The recording apparatus is characterized by including a recording unit, a memory, an encoder and a controller. The recording unit serves to record data on the recording medium. The memory serves to temporarily store input data to be recorded on the recording medium. The encoder serves to perform an encode processing to convert the data read out from the memory to recording data, and supply the recording data to the recording unit. The controller serves to control the operation of the recording unit, the memory and the encoder. When new data are recorded on the recording medium in a state where data have been already recorded on the recording medium and a data recordable (data unrecorded) area exists on the data recording area of the recording medium, the controller reads out the new data from the memory, and controls the recording unit to start its recording operation of the new data from the head position of a data recordable area of the recording medium on the basis of the management data recorded on the recording medium and to delete data which have been already recorded on the recording medium, from the position on the data recording area of the recording medium at which the recording operation of the new data is instructed to start by the same data amount as the new data to be recorded from the head position of the data recordable area of the recording medium.

According to the present invention, there is provided a recording apparatus for a recording medium which has a data recording area on which a data recording and/or reproducing operation is carried out, and a management data area on which management data for managing a recording and/or reproducing operation for the recording medium are recorded, and on which address data are recorded. Data are sectioned into plural blocks every predetermined amount of data as a recording unit, and recorded on plural blocks of the data recording area. On the management data area are recorded data indicating a read-out order of the plural blocks. The recording apparatus is characterized by comprising a recording unit, a memory, an encoder and a controller. The recording unit serves to record data on the recording medium. The memory serves to temporarily store input data to be recorded on the recording medium. The encoder serves to perform an encode processing to convert the data read out from the memory to recording data, and supply the recording data to the recording unit. The controller serves to control the operation of the recording unit, the memory and the encoder. When new data are recorded on the recording medium in a state where data have been already recorded on the recording medium and a data recordable (data unrecorded) area exists on the data recording area of the recording medium, the controller controls the recording unit to delete data which have been already recorded on the recording medium, from the position on the data recording area of the recording medium at which the recording operation of the new data is instructed to start and by data amount of predetermined recording units which are read out from the memory, and at the same time the controller reads out the data from the memory every predetermined recording units and controls the recording unit to start its recording operation of the new data from the head position of the data recordable area.

According to the present invention, the past data are deleted from the recording medium by the same amount as the new data recorded on the recording medium, so that an user can grasp the data amount to be deleted from the position on the recording medium at which the recording is instructed to start, or a data deletion range.

BRIEF DESCRIPTION OF THE DRAWINGS

FIG. 5 is an explanatory diagram showing a sector structure of P-TOC of a magneto-optical disc;

FIG. 6 is an explanatory diagram showing a sector structure of U-TOC of a magneto-optical disc;

FIGS. 8A to 8C are diagrams showing a data overwrite recording operation on a disc according to the first embodiment of the present invention;

FIGS. 9A to 9B are diagrams showing an arrangement state of data on a disc before and after an overwrite recording operation according to the first embodiment of the present invention;

FIG. 10 shows a management state of U-TOC before the overwrite recording operation of the first embodiment according to the present invention;

FIG. 11 shows a management state of U-TOC after the overwrite recording operation of the first embodiment according to the present invention;

FIGS. 13A and 13B are diagrams showing a data arrangement state on a disc before and after the overwrite recording operation according to a modification of the first embodiment of the present invention;

FIG. 14 shows a management state of U-TOC before the overwrite recording operation according to the modification of the first embodiment of the present invention;

FIG. 15 shows a management state of U-TOC after the overwrite recording operation according to the modification of the first embodiment of the present invention;

FIGS. 17A to 17D are diagrams showing a data overwrite recording operation on a disc according to a second embodiment of the present invention;

FIGS. 18A and 18B are diagrams showing a data arrangement state on a disc before and after the overwrite recording operation of the second embodiment of the present invention.

DESCRIPTION OF THE INVENTION

Preferred embodiments of a recording method and a recording apparatus according to the present invention will be described in detail with reference to the accompanying drawings. In the following description, a recordable disc-shaped recording medium is representatively used as a recording medium, and first and second embodiments will be described in this order.

A. First Embodiment
  1. Construction of Recording and Reproducing Apparatus
  2. P-TOC sector
  3. U-TOC sector
  4. Area Structure of Disc
  5. Example 1 of Overwrite Recording Operation
  6. Example 2 of Overwrite Recording Operation
  7. Overwrite Recording Processing
B. Second Embodiment
  8. Example of Overwrite Recording Operation
  9. Overwrite Recording Processing A. First Embodiment <1. Construction of Recording and Reproducing Apparatus>

Figure 4:
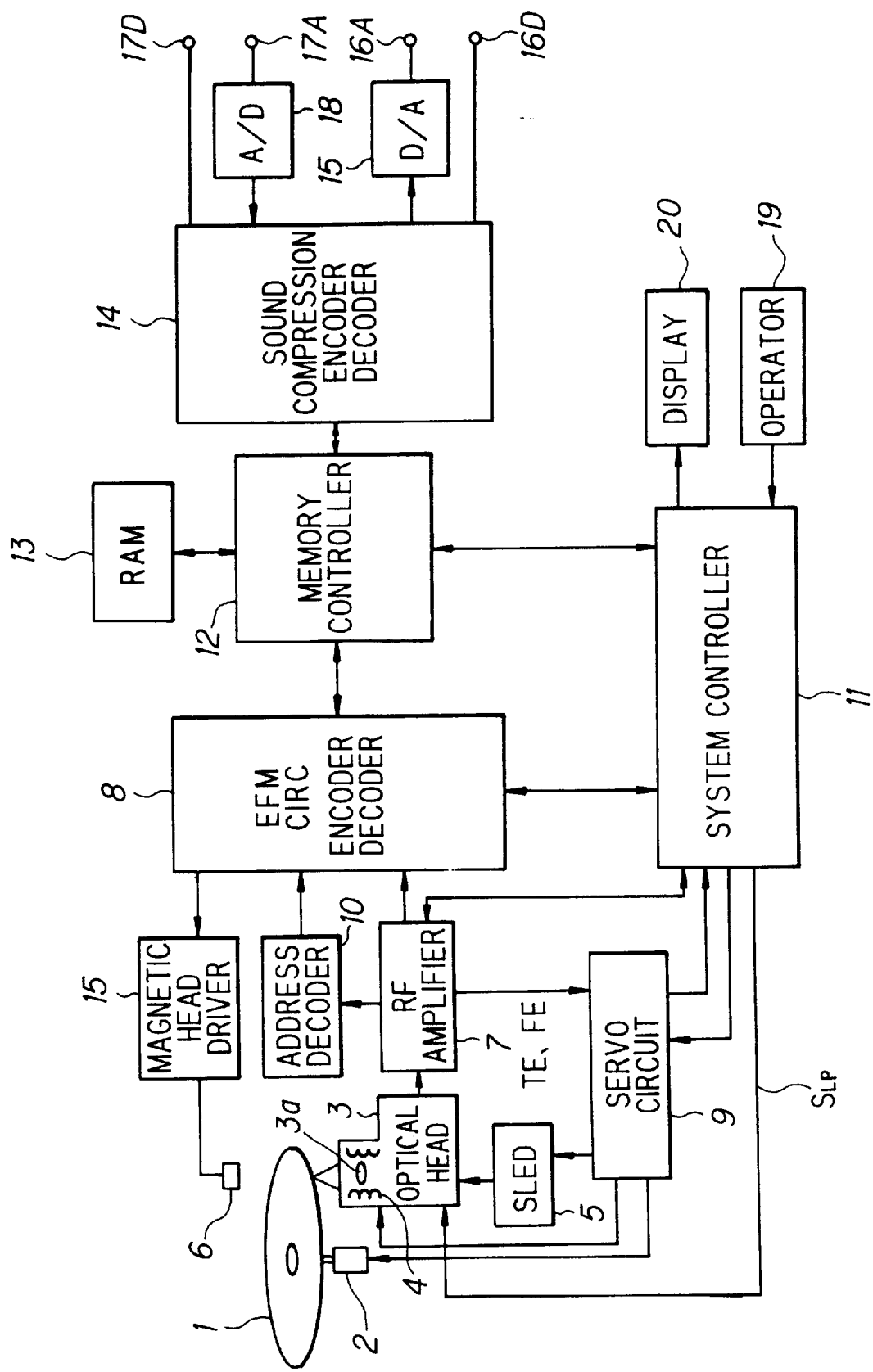
FIG. 4 is a block diagram showing a main part of a recording and reproducing apparatus according to a first embodiment of the present invention.

FIG. 4 is a block diagram showing a main part of the recording and reproducing apparatus of a first embodiment of the present invention.

FIG. 4 schematically shows a state where a disc-shaped recording medium such as a magneto-optical disc 1 on which audio or sound data are recorded is loaded from a disc insertion opening which is provided to a main body of the apparatus. The magneto-optical disc 1 is rotationally driven by a spindle motor 2.

A reference numeral 3 represents an optical head for irradiating a laser beam onto the magneto-optical disc 1 at the recording and reproducing operations. At the recording operation, the optical head 3 irradiates a laser beam having high level output power level to heat recording layer or recording tracks of the magneto-optical disc 1 to Curie temperature. At the reproducing operation, the optical head 3 irradiates a laser beam having relatively low output power level to detect the audio data recorded on the magneto-optical disc 1 on the basis of a reflection light beam from the magneto-optical disc 1 by Kerr effect.

Therefore, the optical head 3 has a laser diode as a light source, an optical system containing a polarizing beam splitter, an objective lens 3a, etc., and a photodetector for detecting the reflection light beam from the magneto-optical disc 1. The objective lens 3a is supported by an actuator 4 so as to be movable in a parallel direction of the optical axis of the objective lens 3a and a perpendicular direction of the optical axis of the objective lens 3a.

A reference numeral 6 represents a magnetic head for generating a vertical magnetic field which is modulated according to recording data and supplying the vertical magnetic field to the magneto-optical disc 1. The magnetic head 6 is disposed so as to face the optical head 3 through the magneto-optical disc 1. The optical head 3 and the magnetic head 6a are supported by a feed mechanism 5 so as to be movable in a radial direction of the disc.

Signals which are read out from the magneto-optical disc 1 by the optical head 3 through the reproducing operation are supplied to an RF amplifier 7. The RF amplifier 7 is supplied the output signal from the optical head 3 and produces an RF signal, a tracking error signal, a focus error signal, absolute position data (absolute position information which is recorded as a pre-group (wobbling group) on the magneto-optical disc 1, address data, a focus monitor signal, etc. The RF signal is supplied to an encoder/decoder unit 8. The tracking error signal and the focus error signal are supplied to a servo circuit 9. The address data and the absolute position information are supplied to an address decoder 10, and the absolute position data and the focus monitor signal are supplied to a system controller 11 which composed of a microcomputer, for example.

The servo circuit 9 generates various kinds of servo signals on the basis of the tracking error signal, the focus error signal and a track jump instruction, a seek instruction, rotational velocity detection data of the spindle motor 2, etc. which are supplied from the system controller 11, and controls the actuator 4 and the feed mechanism 5 on the basis of these signals, thereby performing focus and tracking control. Further, the servo circuit 9 also controls the spindle motor 2 to rotate at a constant angular velocity (CAV) or at a constant linear velocity (CLV).

The RF signal is subjected to decode processing such as EFM decoding, CIRC, etc. in the encoder/decoder 8, and then temporarily stored in a buffer memory 13. The read-out operation of data from the magneto-optical disc 1 by the optical head 3 and the transfer operation of reproduced data in a system including elements from the optical head 3 to the buffer memory 13 are performed at 1.41 Mbit/sec and intermittently. The buffer memory 13 composed of a RAM having 4 Mbyte storage capacity, for example.

The data stored in the buffer memory 13 are read out at such a timing that the reproduced data are transferred at 0.3 Mbit/sec, and supplied to the encoder/decoder 14. Thereafter, the compressed data supplied to the encoder/decoder 14 is subjected to decoding processing and are outputs as digital signals.

The digital signals outputted from the encoder/decoder 14 are converted into analog signals by a D/A converter 15, and supplied to an analog line output terminal 16A. Alternately, the digital signals outputted from the encoder/decoder 14 are directly supplied to a digital output terminal 16D without passing through the D/A converter 15.

The data write/read operation for the buffer memory 13 is carried out while a memory controller 12 controls a writing pointer and a reading pointer to indicate an address. The writing pointer (write-in address) is incremented at the timing of 1.41 Mbit/sec as described above, and the reading pointer (read-out address) is incremented at the timing of 0.3 Mbit/sec. As a result, some amount of data are allowed to be stocked in the buffer memory 13 due to the difference between the write-in bit rate and the read-out bit rate. The increment of the writing pointer is stopped at the time when data whose amount corresponds to the maximum storage capacity of the memory are stocked in the buffer memory 13, and the data read-out operation from the magneto-optical disc 1 by the optical head 3 is also stopped. However, the increment of the reading pointer R is continued, so that the data which are output from the output terminal 16A or output terminal 16D are continuously output without interruption.

Thereafter, only the read-out operation from the buffer memory 13 is continued, and if the data storage amount in the buffer memory 13 is reduced to a predetermined amount or less at a time, the data read-out operation by the optical head 3 and the increment of the writing pointer are restarted again, and thus the data stock into the buffer memory 13 is started.

By outputting the reproduced audio signals through the buffer memory 13 as described above, the output of the reproduced audio signals are not interrupted even when a tracking servo is out of control due to an external disturbance or the like. Accordingly, by accessing a scanning position just before the tracking servo gets out of control and restarting the data read-out operation from the position while the data are still stocked in the buffer memory 13, the reproducing operation can be continued without being disturbed. That is, a vibration-resistant function of the recording and reproducing apparatus can be remarkably improved.

In FIG. 4, the address information output from the address decoder 10 and the subcode data for the control operation are supplied to the system controller 11 through the encoder/decoder 8, and used for various control operations.

The system controller 11 is further supplied with a lock detection signal of a PLL circuit for generating a bit clock of the recording/reproducing operation, and a monitor signal indicating a lock state of a frame synchronizing signal of reproduced data (L,R channels).

The system controller 11 outputs a laser control signal $S_{LP}$ to control the operation of the laser diode of the optical head 3, and on/off-controls the output of the laser diode. At the on-control time, the system controller 11 switches the reproducing laser beam having relatively low level power and the recording laser beam having relatively high level power to each other.

When the data recording operation is performed on the magneto-optical disc 1, analog or digital audio signals are supplied from an external equipment to the recording and reproducing apparatus through a connection code connected to the analog input terminal 17A, an audio optical cable connected to the digital input terminal 17D.

The audio signals which are supplied to the digital input terminal 17D in the form of digital signals are directly input to the encoder/decoder 14. On the other hand, the analog audio signals which are input to the analog input terminal 17A are converted into digital signals by an A/D converter 18, and then supplied to the encoder/decoder 14.

In the encoder/decoder 14, the input digital signals are performed to the audio compression encode processing. The digital data which are compressed by the encoder/decoder 14 are temporarily stored into the buffer memory 13 by the memory controller 12, and then read out at a predetermined timing and supplied to the encoder/decoder 8. The digital data which are output from the encoder/decoder 14 are encoded by processing such as the CIRC encode, EFM modulation, etc. by the encoder/decoder 8, and then supplied to a magnetic head driving circuit 15.

The magnetic head driving circuit 15 supplies a magnetic head driving signal to the magnetic head 6 in accordance with the encoded recording data from the encoder/decoder 8. That is, N-pole or S-pole vertical magnetic field is supplied to the magneto-optical disc 1 by the magnetic head 6. At this time, the system controller 11 supplies a control signal to the optical head 3 to radiate a laser beam having a recording level (high level power).

A reference numeral 19 represents an operational input unit which is provided with various keys to be manipulated by an user, such as operation keys for reproduction/quick traverse/quick return/AMS search/stop/record, etc., operation keys for setting various operation modes, and operation keys for performing various edition processing.

A reference numeral 20 represents a display unit composed of a liquid crystal display, and an operation state, a mode state, a reproduction advancing time, a record advancing time, a track number, etc. are displayed thereon under control of the system controller 11.

When the recording/reproducing operation is performed on the magneto-optical disc 1, the management data recorded on the magneto-optical disc 1, that is, P-TOC (pre-recorded Table Of Contents), U-TOC are read out, and stored into a storage portion of the system controller 11 or an exclusively-used storage portion of the buffer memory 13. In accordance with these management data, the system controller 11 identifies the address of a part to be recorded on the magneto-optical disc 1 or the address of a part to be reproduced. In the first embodiment, the management data are stored in an exclusively-used storage area of the buffer memory 13. Accordingly, a buffer area for recording data/reproducing data as described above and an area for holding the management data are sectionally set in the buffer memory 13.

When the magneto-optical disc 1 is loaded into the recording and reproducing apparatus, the system controller 11 executes the reproducing operation at the innermost side of the disc on which the management data are recorded, thereby reading out the management data, and then stores the read-out management data into the exclusively-used storage area of the buffer memory 13. Subsequently, the system controller 11 refers to the management data in the buffer memory 13 when the recording/reproducing operation is carried out on the magneto-optical disc 1.

The U-TOC is edited to be rewritten in accordance with the recording or deletion of the data. The system controller 11 conducts this edition on the management data of the U-TOC stored in the buffer memory 13 every time the recording/deleting operation is carried out, and it also conducts the rewriting operation on the U-TOC area of the magneto-optical disc 1 at a predetermined timing in accordance with the above rewriting operation of the management data of the U-TOC.

<2. P-TOC Sector>

Here, an audio data sector which is recorded in the form of sector data on the magneto-optical disc 1 and a P-TOC sector which is management data for managing the recording/reproducing operation of the audio data will be first described.

With the management data of the P-TOC, area indication for recordable areas, etc. on the magneto-optical disc 1, management of U-TOC area, etc. are performed. When a disc loaded into the apparatus is a pre-recorded disc which is a read-only disc, pieces of music which are recorded with pits like a so-called Compact disc can be also managed with the P-TOC.

FIG. 5 shows a format of the P-TOC, and more particularly it shows one sector (sector 0) of P-TOC information which is repetitively recorded on an area for P-TOC, for example, a unrewritable area at the innermost peripheral side of the disc. The description of a sector 1 and subsequent sectors thereof in the P-TOC format is omitted.

A data area (4 bytes×588=2352 bytes) of a P-TOC sector is provided, at the head position thereof, with 4 bytes for a synchronization pattern composed of one byte data of all "1" or all "0", and an address representing a cluster address and a sector address, etc. This 4-byte area constitutes a header, and with this header, it is indicated that the area is an area of the P-TOC. Subsequently to the header, an identification ID of ASCII code which corresponds to a character "MINI" is added at a predetermined address position.

Subsequent to the ID are recorded a disc type representing whether a loaded disc is a recordable disc or a read-only disc (disc used exclusively used for reproduction), a recorded sound level or recording level, the number of the first piece of music recorded (First TNO), the number of the last piece of music recorded, a read-out start address $RO_A$, a power calibration area start address $PC_A$, a start address $UST_A$ of U-TOC (a data area of U-TOC sector 0 of FIG. 6 as described later), a start address $RST_A$ of a recordable area (recordable user area), etc.

Subsequently to the above areas is provided a corresponding table indicating data portion having table pointers (P-TNO1 to P-TNO255) with which respective pieces of music recorded are allowed to correspond to part tables of a management table portion as described later.

Figure 1:
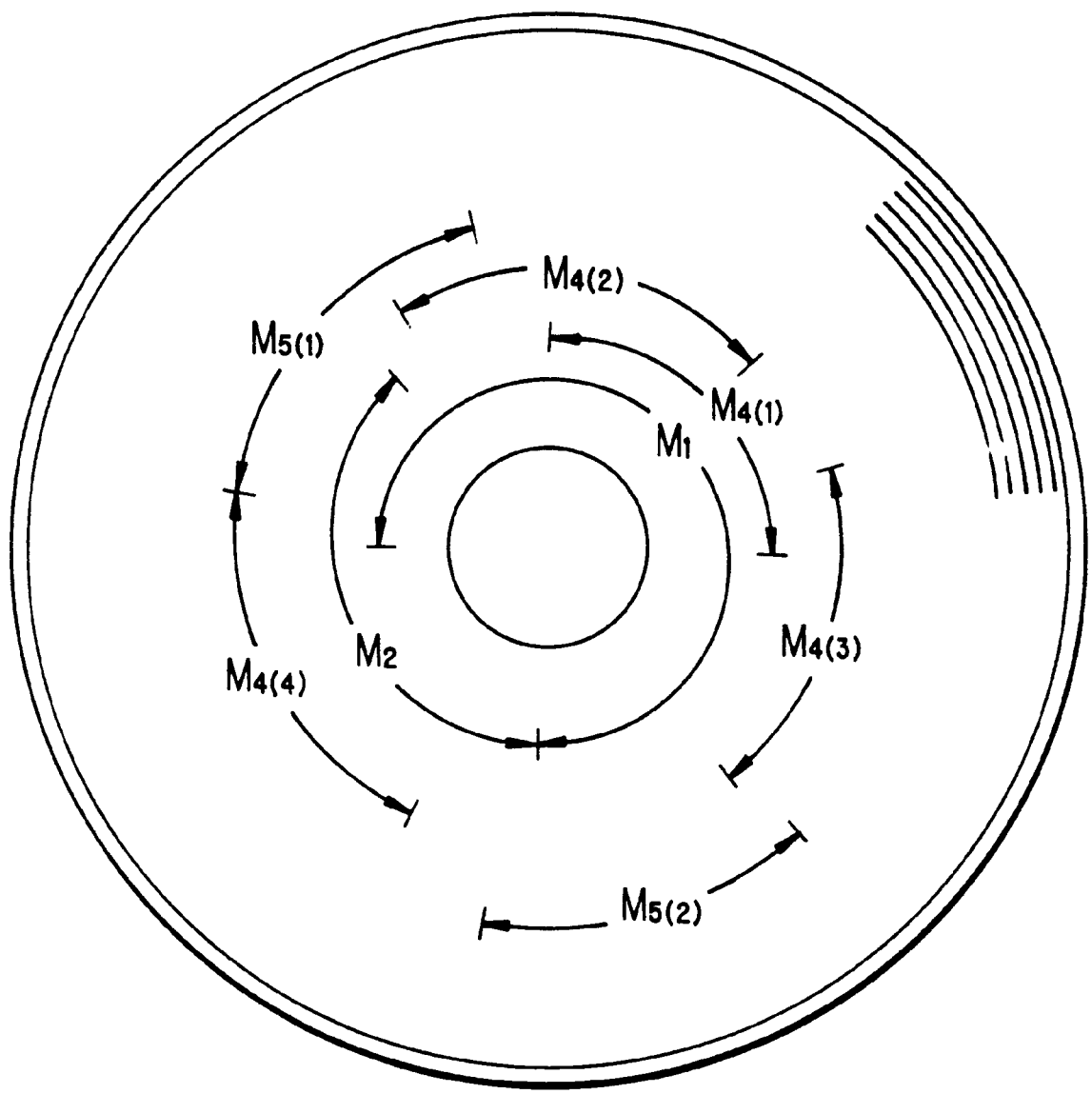
FIG. 1 is a diagram showing a recording format on a disc.
Figure 2:
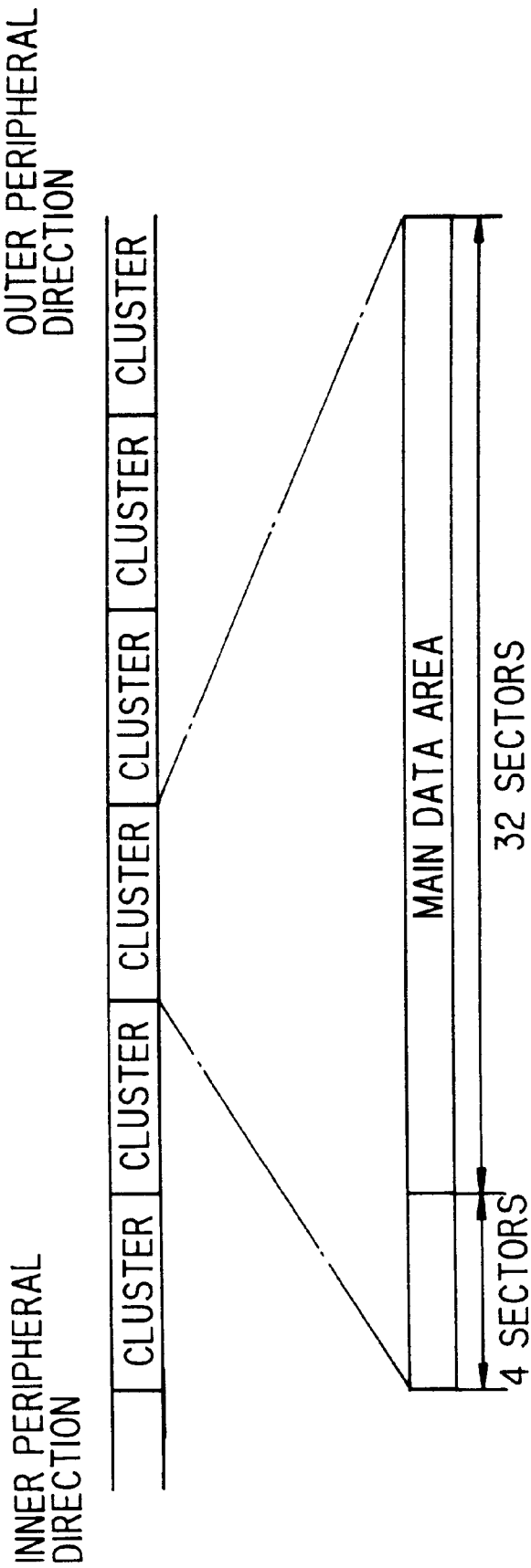
FIG. 2 is a diagram showing a sector structure of data recorded on a disc.
Figure 3A:
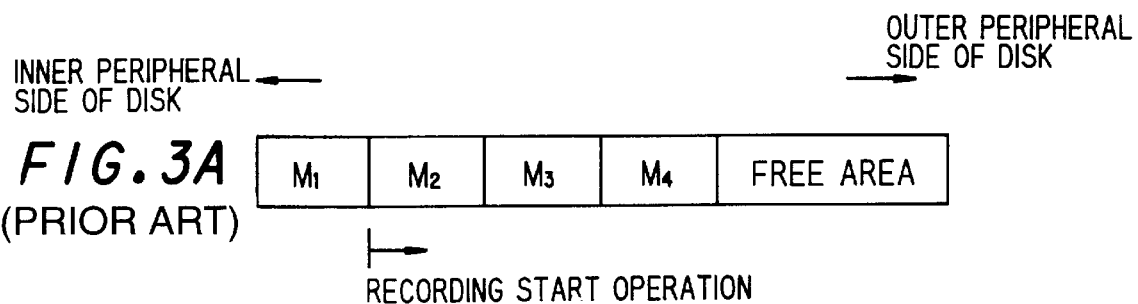
FIGS. 3A to 3D are diagrams showing a data overwrite recording operation on a disc.
Figure 3B:
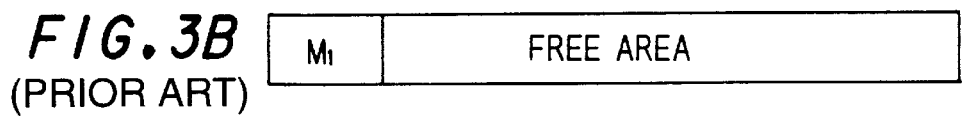
Figure 3C:
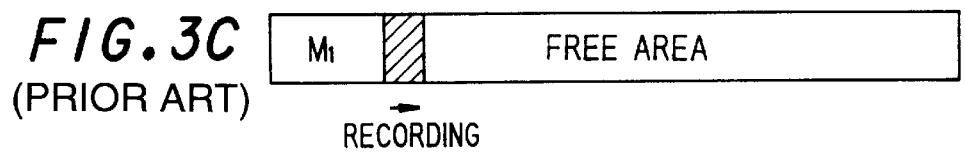
Figure 3D:

The management table portion having 255 part tables from (01h) to (FFh) which are provided in correspondence with the table pointers (P-TNO1 to P-TNO255) of the corresponding table indicating data portion is provided on an area subsequent to the corresponding table indicating data portion. In this specification, a numerical value affixed with "h" is represented with hexadecimal notation. Each of the part tables is designed to be recordable with a start address serving as a start point for a part, an end address serving as an end point for the part and mode information for the part (track). The term "part" means a track portion on which those data which are continuous on time axis are recorded physically continuously, and for example, $M_1$ and $M_{4(4)}$ as shown in FIG. 1 correspond to track portions.

The mode information of a track in each part table means information as to whether the part is set to a rewrite-inhibition mode or a data copy-inhibition mode, information as to whether it is audio information, information on classification of monaural/stereo, etc.

With respect to the respective part tables from (01h) to (FFh) in the management table portion, the contents of the parts (part tables) are represented with the table pointers (P-TNO1 to P-TNO255) of the corresponding table indicating data portion. That is, with respect to the first piece of music, a part table (for example, (01h) is recorded as a table pointer P-TNO1 (However, a numerical value which can represent the part table with its byte position in the P-TOC sector through predetermined calculation processing is actually written in the table pointer) is recorded as a table pointer P-TNO1. In this case, the start address of the part table (01h) is a start address at the recording position of the first piece of music, and likewise the end address thereof is an end address at the position at which the first piece of music is recorded. The mode information of the track is the information on the first piece of music.

Likewise, with respect to the second piece of music, the start and end addresses of the recording position of the second piece of music and the mode information of the track are recorded in the part table (for example, (02h)) which is represented by the table pointer P-TNO2.

With the table pointers, the table pointers of 255, from (P-TNO1) to (P-TNO255), are prepared, and thus 255 pieces of music can be managed on the P-TOC. As described above, by forming the sector 0 of the P-TOC, a desired piece of music can be accessed and reproduced at the reproducing time.

With respect to a recordable/reproducible magneto-optical disc, there exists no pre-recorded music area thereon. Therefore, the corresponding table indicating data portion and the management table portion as described above are not used, and these are managed by an U-TOC as described layer. Accordingly, all of the bytes are set to "00h".

However, with respect to a pre-recorded type disc on which all pieces of music are recorded in the form of pits and a hybrid type disc having both a read-only area (area which is used exclusively for reproduction and on which pieces of music, etc. are recorded) and a recordable area composed of a magneto-optical area, the corresponding table indicating data portion and the management table portion as described above are used to manage the pieces of music in the read-only area.

<3. U-TOC Sector>

Next, U-TOC will be described below.

FIG. 6 shows the format of a sector (sector 0) of U-TOC, and this sector mainly contains a data area having management data for pieces of music which have been recorded by an user, and unrecorded areas (free areas) on which new pieces of music can be recorded. The sector 1 and subsequent sectors of the U-TOC are also optional, and the description thereof is omitted.

For example, when a piece of music is recorded on the disc 1, the system controller 11 searches a free area on the disc 1 on the basis of the management data of the U-TOC to record audio data on the searched free area. At the reproduction time, the system controller 11 identifies, on the basis of the management data of the U-TOC, an area on which a piece of music to be reproduced is recorded, and accesses the area to perform the reproducing operation.

Like the P-TOC, the sector (sector 0) of the U-TOC is provided with a header at the head position, and subsequently provided with data on a maker code, a model code, the number of the first piece of music (First TNO), the number of the last piece of music (Last TNO), a sector use state, the serial number of the disc, a disc ID, etc. at predetermined addresses. On the sector 0 of the U-TOC are further provided areas on which various table pointers (P-DFA, P-EMPTY, P-FRA, P-TNO1 to P-TNO255) are recorded as the corresponding table indicating data portion. With these table pointers, recording areas for pieces of music which are recorded by the user, non-recording areas, etc. are allowed to correspond to a management table portion as described above to thereby identify these areas.

255 part tables of (01h) to (FFh) are provided for the management table portion to which the table pointers (P-DFA to P-TNO255) of the corresponding table indicating data portion are allow to correspond. Like the sector 0 of the P-TOC as shown in FIG. 5, each part table is recorded with a start address serving as a start point for a part, an end address serving as an end point for the part, and the mode information for the part. Furthermore, with respect to the U-TOC sector 0, in some cases a part which is indicated by each part table is continuously linked to another part. Accordingly, the part table is further recorded with link information representing a part table on which the start address and the end address of the part to be linked are recorded.

In this type of recording and reproducing apparatus, no trouble would occur because the reproducing operation proceeds while successively accessing parts even if the music data of a piece of music are recorded physically discontinuously, that is, divisionally recorded over plural parts. Therefore, with respect to pieces of music, etc. which are recorded by the user, in some cases the user dares to record a piece of music while dividing the music data of the piece of music into plural parts for the purpose of effective use of the recordable areas. Therefore, the link information to link the respective parts to each other is provided. For example, part tables to be linked to one another are indicated with numbers (01h) to (FFh) which are given to the respective part tables (actually, represented by numeral values each of which corresponds to the byte position in the U-TOC sector 0 through the predetermined calculation processing), and then linked to one another. With respect to the music data of piece of music, etc. which are beforehand recorded in the form of pits, the link information of all the part tables is set to "(00h)" in the P-TOC sector 0 as shown in FIG. 5, because these music data are not divided into parts in normal cases.

That is, in the management table portion in the U-TOC sector 0, one part table represents one part. For example, for a piece of music which is constructed by linking three parts to one another, the part position of the piece of music is managed by the three linked part tables.

The part content of each of the part tables from (01h) to (FFh) in the management table portion of the U-TOC sector 0 is indicated as follows with the table pointers (P-DFA, P-EMPTY, P-FRA, P-TNO1 to P-TNO255) of the corresponding table indicating data portion.

The table pointer P-DFA indicates a defective area on the magneto-optical disc 1, and specifies a part table or a part table at the head of plural part tables in which a track portion (part) serving as a defective area due to scratch or the like is indicated. That is, when a defective part exists, any one of (01h) to (FFh) is recorded in the table pointer P-DFA, and the defective part is indicated with the start and end addresses in the corresponding part table. If another defective part exists, another part table is indicated as link information for the former part table, and the defective part is also indicated in the part table. If no other defective parts exist, the link information is set to "(00h)" for example, and it is indicated that there is no defective part to be subsequently linked.

The table pointer P-EMPTY specifies an unused part table or one of plural unused part tables in the management table portion. If an unused part table exists, any one of (01h) to (FFh) is recorded as the table pointer P-EMPTY. If plural unused part tables exist, these part tables are successively indicated from a part table indicated by the table pointer P-EMPTY with the link information, and all the unused part tables are linked to one another on the management table portion.

The table pointer P-FRA indicates a data rewritable free area (containing a deletion area) on the magneto-optical disc 1, and specifies a part table or one of plural part tables on which a track portion (part) serving as a free area is indicated. That is, if a free area exists, any one of (01h) to (FFh) is recorded in the table pointer P-FRA, and the part serving as the free area is specified with the start and end addresses in the corresponding part table. If there exist a plurality of such parts, that is, part tables, the part tables are successively indicated with the link information until the indication reaches a part table having link information of "(00h)".

Figure 7:
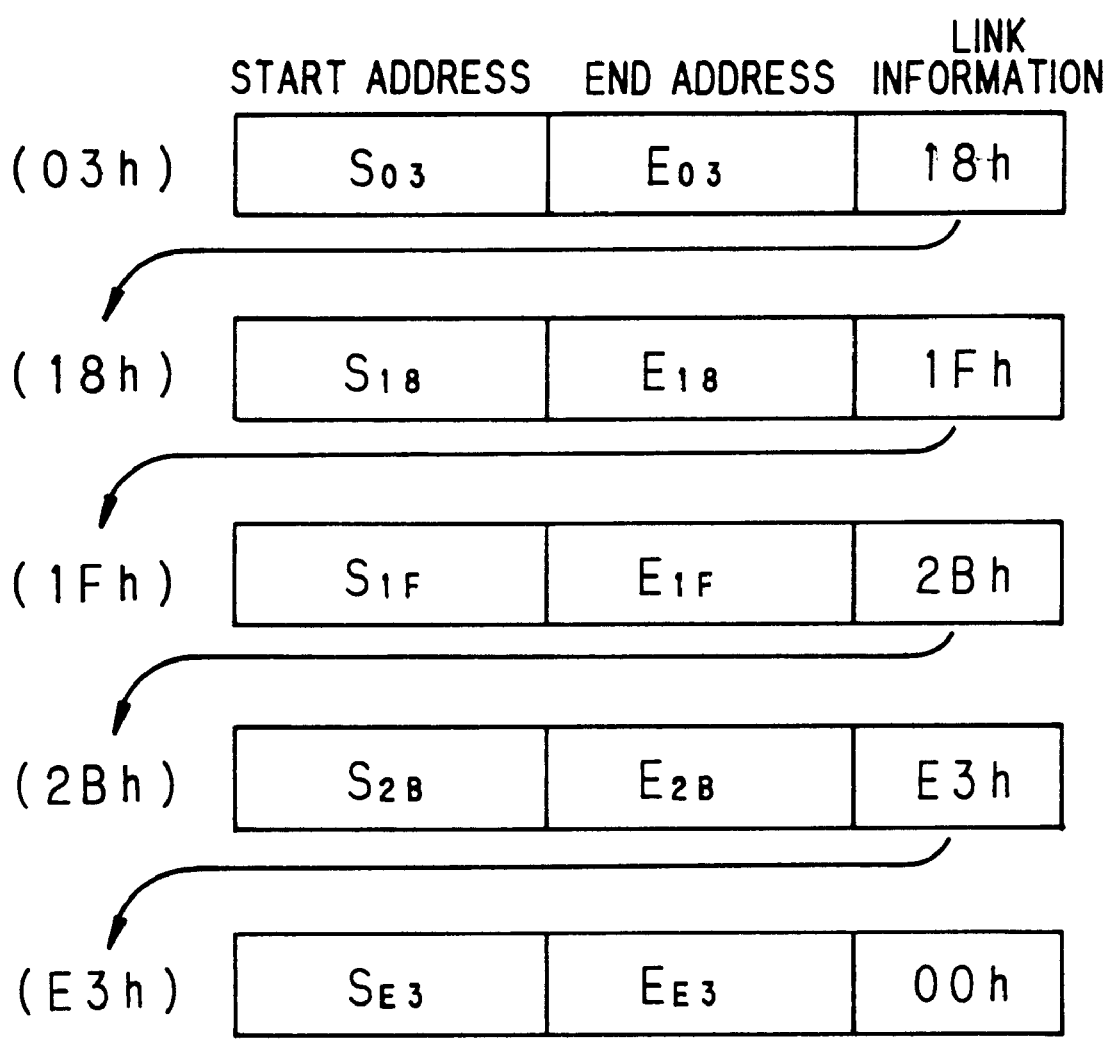
FIG. 7 is a diagram showing a link structure of U-TOC of a magneto-optical disc.

FIG. 7 schematically shows a management state of parts serving as free areas with part tables. This represents a state that when parts (03h)(18h)(1Fh)(2Bh)(E3h) are set as free areas, this state is represented by the link of the part tables (03h)(18h)(1Fh)(2Bh)(E3h). The same is satisfied for the management mode for the defective areas as described above and the unused part tales.

If no audio data of pieces of music are recorded and no defect exists on the magneto-optical disc, the part table (01h) is indicated by the table pointer P-FRA, whereby the whole recordable user area on the disc is indicated to be an unrecorded area (free area). In this case, the remaining part tables of (02h) to (FFh) are not used. Therefore, the part table (02h) is indicated by the table pointer P-EMPTY as described above, the part table (03h) is indicated with the link information of the part table (02h), and the part table (04h) is indicated with the link information of the part table (03h). This linking indication is continued until it reaches the part table (FFh). In this case, the link information of the part table (FFh) is set to "(00h)" which represents no subsequent linkage.

At this time, for the part table (01h), the start address of the recordable user area is recorded as a start address, and the address just before the read-out start address is recorded as an end address.

The table pointers P-TNO1 to P-TNO255 indicate pieces of music which the user have recorded on the magneto-optical disc 1. For example, the table pointer P-TNO1 specifies a part table indicating a part or one of plural parts at the head position on time on which the music data of the first piece of music are recorded.

For example, when the music data of the first piece of music are recorded while the track is not divided into plural parts, that is, the music data are recorded on one part, the recording area of the first piece of music is recorded as the start and end addresses in the part table indicated by the table pointer P-TNO1.

For example, when the music data of a second piece of music are discretely recorded over plural parts on the disc, parts for indicating the recording position of the music data are specified in time order. That is, on the basis of a part table indicated by the table pointer P-TNO2, other part tables are successively indicated in time order with link information, and this linkage is continued until a part table having link information of "(00h)" (in the same mode as FIG. 7). As described above, all the parts on which the data constituting the second piece of music are recorded are successively indicated, and thus when the second piece of music is reproduced or the data overwrite operation is performed on the area of the second piece of music, the optical head 3 and the magnetic head 6 are actuated to access to take out music data from the discrete parts or record the music data with effective use of the recording area by using the data of the U-TOC sector 0.

As described above, the areas on the disc are managed by the P-TOC, and the music data recorded on the recordable user area, the free areas, etc. are managed by the U-TOC. These TOC data are read and stored into the buffer memory 13, and the system controller 11 can refer to these data.

<4. Area Structure of Disc>

Next, the structure of the recording area of the disc will be described. FIG. 8A schematically shows the structure of the recording area of the disc in the radial direction of the disc.

In the magneto-optical disc 1, the recording area is mainly classified into an area (pre-recorded area) which is represented as a pit area in FIG. 8A and on which data are recorded with embossed pits, and a groove area serving as a data recording area which is provided with grooves.

The P-TOC as described above is repetitively recorded on the pit area. As described above, in the P-TOC, the position of the U-TOC is represented as the U-TOC start address $UST_A$, and the respective positions shown in FIG. 8A are represented as a start address $RO_A$ of the read-out, a start address $RST_A$ of the recordable user area, a start address $PC_A$ of the power calibration area, etc.

The groove area is formed subsequently to the pit area at the innermost peripheral side of the disc. In the groove area, an area which extends to the address represented as the start address $RO_A$ of the read-out in the P-TOC is allocated as a recordable user area, and an area subsequent to the read-out start address $RO_A$ is allocated as a read-out area.

Of the recordable area, a recordable user area on which data are actually recorded extends from the start address $RST_A$ of the recordable user area to the position just before the start address $RO_A$ of the read-out.

An area before the start address $RST_A$ of the recordable user area in the groove area is used as a management area for the recording and reproducing operation, and the U-TOC as described above, etc. are recorded on this area. One cluster is further provided from the position represented by the start address $PC_A$ of the power calibration area, and this cluster is used as a calibration area for a laser beam, that is, a trial recording area for setting the output power level of the laser beam.

The U-TOC is continuously recorded by the amount corresponding to three clusters (1 cluster=36 sectors) from the position which is represented by the U-TOC start address $UST_A$ in the management area for the recording and reproducing operation.

Actual audio data are recorded on the recordable user area as shown in FIG. 8A. For example, for the music data $M_1$ to $M_4$ of four pieces of music, the music data $M_1$ of the first piece of music is recorded on a part between addresses $A_0$ and $A_1$, the music data $M_2$ of the second piece of music is recorded at a part between addresses $A_2$ to $A_3$, the music data $M_3$ of the third piece of music is recorded on a part between addresses $A_4$ to $A_5$, and the music data of the fourth piece of music is recorded at a part between addresses $A_6$ to $A_7$. In this state, a free area on which music data have not yet been recorded is set as a part between addresses $A_8$ and $A_9$. Such a recording state is managed by the table pointers P-TNO1 to P-TNO4, P-FRA and the part tables linked thereto in the U-TOC as described above. The management state in this case is shown in FIG. 10. Assuming that the recordable user area in FIG. 8A has no defect, the table pointer P-DFA is set to "00h".

In order to manage an unrecorded area (free area), for example when a part table of (05h) is indicated in the table pointer P-FRA, information on the part serving as the free area in FIG. 8A is indicated in the part table of (05h) in correspondence to the indication in the table pointer P-FRA. That is, the address $A_8$ is indicated as the start address, and the address $A_9$ is indicated as the end address. In this case, since no free areas serving as other parts exist, the link information of the part table (05h) is set to "00h".

With the music data $M_1$ of the first piece of music, the start address $A_0$ and the end address $A_1$ thereof are indicated in the part table of (01h) which is indicated in the table pointer P-TNO1. The music data $M_1$ is recorded on one part, so that the link information of the part table (01h) is set to "00h".

With the second music data $M_2$, the third music data $M_3$ and the fourth music data $M_4$, the part positions thereof are managed by the part tables which are obtained from the table pointers P-TNO2, P-TNO3 and P-TNO4 as start points, respectively. In this case, only four pieces of music are recorded, and thus the table pointers P-TNO5 to P-TNO255 are not used, so that the link information is set to "00h".

In this case, the table pointer P-EMPTY for indicating unused part tables indicates a part table of (06h), and all unused part tables from the part table (06h) to the part table (FFh) are linked to one another with the link information.

<5. Example 1 of Overwrite Recording Operation>

An operation of overwriting data on the magneto-optical disc 1 using the recording and reproducing apparatus of this embodiment, for example when the music data $M_1$ to $M_4$ are recorded on the magneto-optical disc as shown in FIG. 8A, will be described with reference to FIGS. 8A to 11.

As described above, the recording state of FIG. 8A is managed according to such a format as show in FIG. 10. In this case, a data arrangement on the disc which is developed on a reproduction time axis is shown in FIG. 9A. That is, when the reproduction is performed on the disc, the pieces of music ($M_1$ to $M_4$) are successively reproduced in this order, and the producing operation is finished at the time when the rendition of the piece of music ($M_4$) is completed.

Now, it is assumed that the user starts the recording operation on the disc at the time when the reproduction proceeds to the head position of the second piece of music $M_2$ on time axis (which physically corresponds to the address $A_2$). In this case, first, the system controller 11 starts the data deleting operation from the address $A_2$ as shown in FIG. 8B, and detects the head of the free area on the basis of the management data of the U-TOC to start the data recording operation on a free area, that is, an area which extends from the address $A_8$ to subsequent addresses in FIG. 8B.

For example, data of one cluster are deleted from the address $A_2$, and data of one cluster are subsequently recorded from the address $A_8$. Subsequently, in the same manner as described above, the past data of the piece of music ($M_2$) of one cluster are further deleted subsequent to the area which was deleted in the previous deleting operation, and at the same time data of one cluster are recorded on the free area subsequent to the area which was recorded in the previous recording operation. That is, each of the deleting and recording operations is repetitively performed one cluster by one cluster.

When the above recording operation is continued, the time length of the recording data in the free area becomes equal to the time length of the data deleted portion in the area for the music data $M_2$ as indicated by a hatched portion of FIG. 8B.

The deleting operation is carried out in the edition processing of the U-TOC in the buffer memory 13, that is, such edition processing that the area for the past music data $M_2$ is enrolled into the free area from the address $A_2$ on cluster basis. As described later, the management data of the U-TOC after the edition processing is performed are written into the U-TOC on the disc 1.

At the time when the data have been just recorded on an area extending from the address $A_8$ to $A_{10}$ as shown in FIG. 8C, the past data recorded on the area for the music data $M_2$ have been just deleted within a reproduction time position range having the same time length as the data which have been just recorded on the free area, that is, the past data within an area extending from the address $A_2$ to $A_{11}$ have been just deleted, and this deleted area is enrolled into the free area and managed on the U-TOC.

If the recording stop is instructed through the operation input unit 19 at this time, the recorded data are set as new music data $M_2$, and the past music data $M_2$ are deleted. The new music data $M_2$ are managed on the U-TOC. With respect to the music data $M_3$, a portion of the music data $M_3$ which extends from the address $A_4$ to the address $A_{11}$ are deleted, however, the other portion extending from the address $A_{13}$ to the address $A_6$ remains. In addition, the whole music data $M_4$ remains. Therefore, the data recording state on the reproduction time axis after the above recording operation is completed is shown in FIG. 9B. That is, only the past data are deleted by the same amount as the newly recorded music data $M_2$ (i.e., the past music data $M_2$ and the first half of the music data $M_3$ are deleted). Accordingly, the user can recognize the recording state on the disc after a new piece of music is recorded as if he overwrote it on a compact cassette tape.

At the time when the recording operation is completed, the U-TOC is rewritten as shown in FIG. 11. That is, the table pointer P-TNO2 indicating the music data $M_2$ indicates the part table (06h), and the start address $A_8$ and the end address $A_{10}$ are indicated in the part table (06h). Furthermore, the addresses $A_2$ to $A_{11}$ are written as a free area in the part table (07h) which is linked from the part table (05h). The start address of the music data $M_3$ is set as an address $A_{13}$ in the part table (03h). The above edition leaves the part table (02h) unused, so that it is enrolled into the linkage from the table pointer P-EMPTY. The data recorded on the disc are managed on the U-TOC as described above, so that the respective pieces of music (the music data $M_1$, the new music data $M_2$, the remaining portion of the music data $M_3$, the music data $M_4$) are successively reproduced in this order as shown in FIG. 9B.

The edited state (format) of the U-TOC after the recording operation as described above is completed is not limited to the state (format) shown in FIG. 11. For example, the part tables to be used after the edition, the data-rewritten portion, the link order for the free areas or unused part tables, etc. are dependent on an edition processing software which is installed into the system controller 11. For example, the concrete data-rewritten portion of the U-TOC for managing the state of FIG. 9B may be set to a portion different from that shown in FIG. 11. Accordingly, FIG. 11 shows an example of the state after the edition.

<6. Example 2 of Overwrite Recording Operation>

Figure 12A:
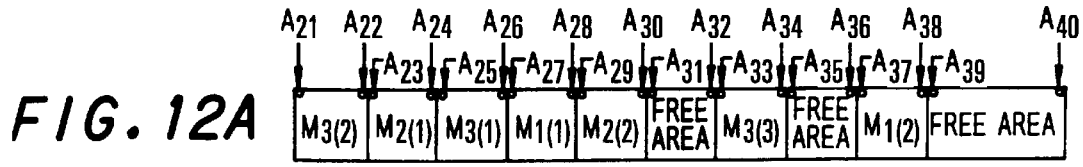
FIGS. 12A to 12E are diagrams showing another embodiment of the data overwrite recording operation on a disc according to the first embodiment of the present invention.

Next, an operation of overwriting data on the magneto-optical disc 1 using the recording and reproducing apparatus of this embodiment when music data $M_1$ to $M_3$ are recorded as shown in FIG. 12A will be described with reference to FIGS. 12A to 15.

In this case, each of the music data $M_1$ to $M_3$ composed of plural parts, and each of the respective music data $M_1$ to $M_3$ is discretely recorded while being divided into plural parts (the music data $M_1$ are divided into parts $M_{1(1)}$ and $M_{1(2)}$, the music data $M_2$ is divided into parts $M_{2(1)}$ and $M_{2(2)}$, and the music data is divided into parts $M_{3(1)}$, $M_{3(2)}$ and $M_{3(3)}$.

This recording state is managed on the U-TOC as shown in FIG. 14, for example.

First, the data management of the first music data $M_1$ is performed as follows. The start address $A_{27}$ and the end address $A_{28}$ of the part $M_{1(1)}$ are indicated in a part table (01h) which is indicated in a table pointer P-TNO1, and the start address $A_{37}$ and the end address $A_{38}$ of the part $M_{1(2)}$ are indicated in a part table (03h) which is subsequently linked to the part table (01h). Accordingly, the addresses of each part and the order on the reproduction time axis are managed as described above.

The data management of the second music data $M_2$ is performed as follows. A part table (04h) in which the start and end addresses $A_{23}$ and $A_{24}$ of the part $M_{2(1)}$ are indicated is linked from a table pointer P-TNO2, and a part table (02h) in which the start and end addresses $A_{29}$ and $A_{30}$ of the part $M_{2(2)}$ is linked from the part table (04h).

The data management of the third music data $M_3$ is performed as follows. A table pointer P-TNO3, a part table (05h), a part table (06h) and a part table (07h) are successively linked to one another in this order, and the addresses of each part $M_{3(1)}$, $M_{3(2)}$, $M_{3(3)}$ and the time order are managed.

There are three parts as free areas in FIG. 12A. These parts are also managed by successively linking a table pointer P-FRA, a part table (08h), a part table (09h) and a part table (0Ah) to one another in this order.

If the physical recording state shown in FIG. 12A is shown in terms of the arrangement state of data recorded on the disc in the reproduction time axis direction, it corresponds to the state shown in FIG. 13A. When the reproducing operation is carried out on this disc, the music data $M_1$ to $M_3$ are successively reproduced in this order, and the reproducing operation is finished at the rendition end time of the music data $M_3$.

Figure 12B:
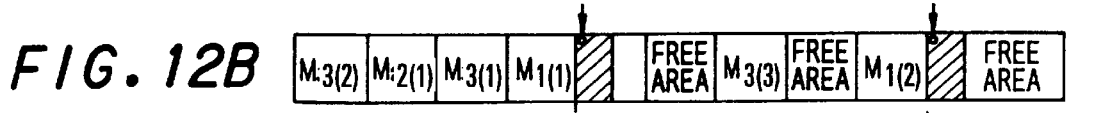
Figure 12C:
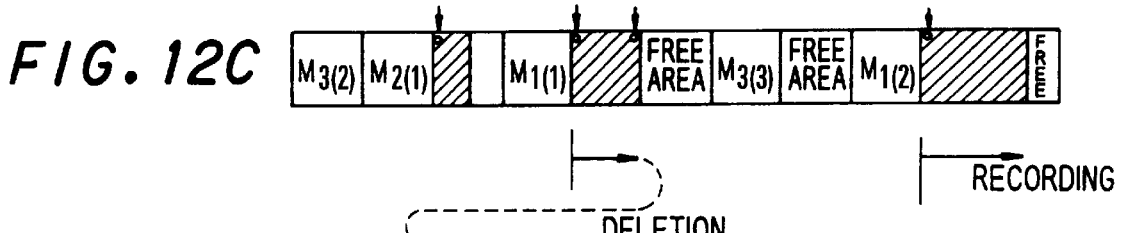

Now, it is assumed that the user starts the recording operation at the time when the reproducing operation proceeds to the head position of the part $M_{2(2)}$ (physically, address $A_{29}$) which corresponds to a position on the reproduction time axis (time) in the middle of the second piece of music ($M_2$). In this case, the system controller first deletes data from the address $A_{29}$ as shown in FIG. 12B, and detects the head of a free area on the basis of the management data of the U-TOC to start the recording operation of the free area from the address $A_{39}$.

That is, the data deletion of one cluster and the data recording of one cluster on the free area are repeated on the part $M_{2(2)}$ using these addresses as start points. Accordingly, as indicated by a hatched portion of FIG. 12B, the time length of the data recorded on the free area is equal to the time length of the data-deleted portion of the area for the music data $M_2$.

Here, after the recording operation is continued and all the addresses $A_{29}$ to $A_{30}$ for the part $M_{2(2)}$ are deleted, an area which is continuous with the part $M_{2(2)}$ on the reproduction time axis, that is, the head part $M_{3(1)}$ of the third music data $M_3$ is deleted. Physically, the deletion of the recorded data is started from the address $A_{25}$ subsequent to the deletion of the recorded data until the address $A_{30}$.

Figure 12D:
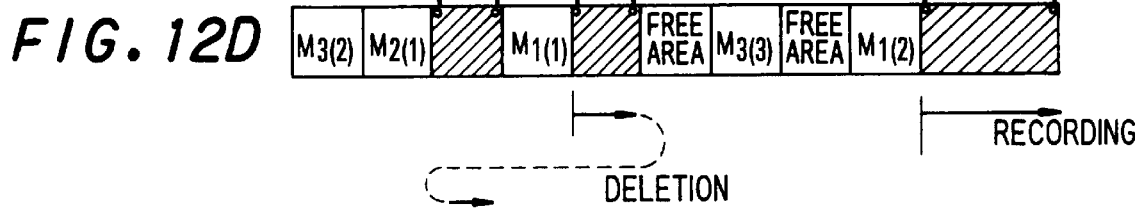

For example, at the time when new data are recorded on an area extending from an address $A_{39}$ to an address $A_{40}$ as shown in FIG. 12D, data in a reproduction time position range having the same time length or same data amount as the newly-recorded data, that is, in this case, the data which have been already recorded within the area between the addresses $A_{29}$ and $A_{30}$ and within the area between the addresses $A_{25}$ and $A_{26}$ are deleted with the address $A_{29}$ set as a deletion start point, and these data-deleted portions are enrolled as a free area and managed on the U-TOC.

Figure 12E:
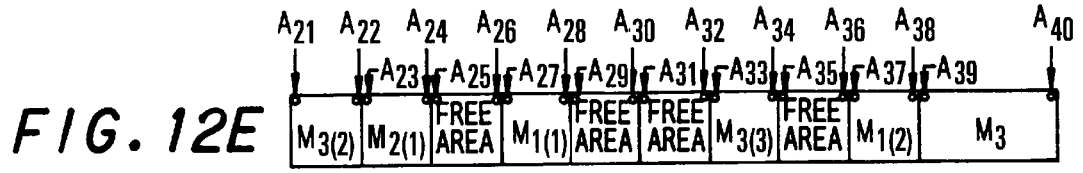

Assuming that the recording operation is stopped through the operation input unit 19 at this time, through the edition processing of the management data of the U-TOC, the data recording state is managed as shown in FIG. 12E if it is viewed in terms of the physical position on the disc, or it is equivalent to a state shown in FIG. 13B if it is viewed on the reproduction time axis.

That is, the data which are newly recorded in the present recording operation are set as the music data $M_3$, and the old music data $M_2$ which have been recorded on the magneto-optical disc 1 before the present recording operation are newly set as the music data $M_2$ having only the first half part $M_{2(1)}$ of the old music data $M_2$ (i.e., the other part of the music data $M_2$ is deleted). With respect to the old music data $M_3$, the part $M_{3(1)}$ is deleted while only the parts $M_{2(2)}$ and $M_{3(3)}$ remain, however, the remaining parts of the old music data $M_3$ are managed as fourth music data $M_4$ because the newly-recorded data are managed as the music data $M_3$.

Accordingly, at the time when the recording operation is completed, the U-TOC is rewritten as shown in FIG. 15. That is, the music data $M_2$ is set as a single part which is not linked to another part, and whose start and end addresses $A_{25}$ and $A_{24}$ are indicated in the part table (04h) which is indicated by the table pointer P-TNO2. With respect to the new music data $M_3$, the start address $A_{39}$ and the end address $A_{40}$ thereof are written in the part table (08h) indicated by the table pointer P-TNO3.

Furthermore, the parts of the addresses $A_{29}$ and $A_{30}$ and the addresses $A_{25}$ and $A_{26}$ on which the data are deleted are written as free areas in the part tables (02h) and (05h) which are linked from the part table (0Ah).

Still furthermore, the remaining parts ($M_{3(2)}$, $M_{3(3)}$) of the old music data $M_3$ which have been recorded before the present recording operation are indicated as parts $M_{4(1)}$ and $M_{4(2)}$ of new music data $M_4$ by the linkage from the table pointer P-TNO4 through the part table (06h) to the part table (07h).

The above state after the edition is an example, and thus the concrete rewriting portion is dependent on the software.

<7. Overwrite Recording Operation>

Figure 16:
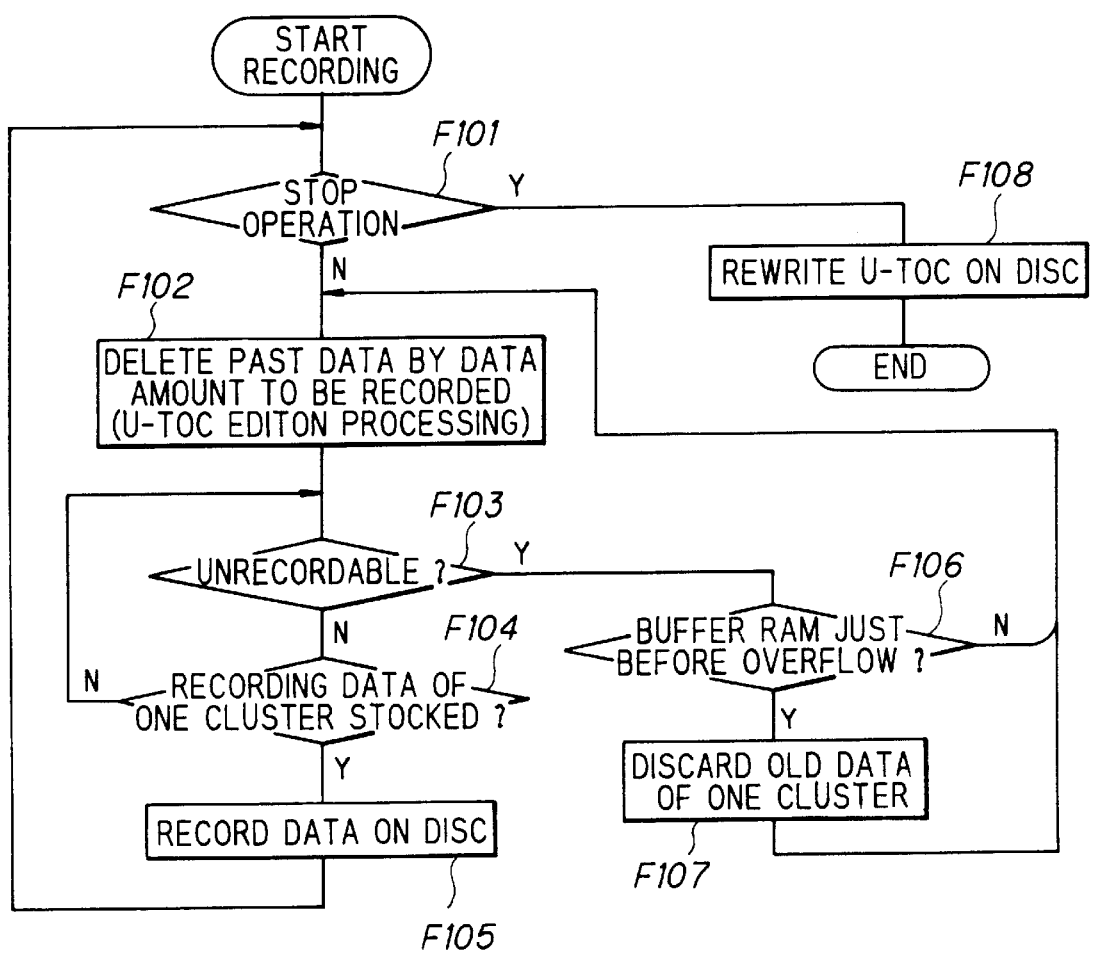
FIG. 16 is a flowchart for the data overwrite recording operation on a disc according to the first embodiment of the present invention.

The two examples of the overwriting operation of the first embodiment are described above, and the processing of the system controller 11 for the overwrite recording operation as described above will be described with reference to a flowchart of FIG. 16.

When the recording start operation is instructed through the operation input unit 19, only the past data (data recorded on the disc 1) of one recording unit are deleted from the reproduction time position (F102). In this embodiment, one recording unit corresponds to one cluster, and thus the past data of one cluster are deleted.

Subsequently, the process waits until data of one cluster are stocked in the buffer memory 13 (F104), and then data of one cluster are recorded on a free area at the time when the data are stocked. Basically, the above operation is repeated to perform a recording operation of new data.

However, in some cases, a track jump may occur due to vibration applied to the recording and reproducing apparatus, so that the optical head 3 and the magnetic head 6 cannot perform a proper recording operation. In this case, the process goes from step F103 to F106, and returns to step F102 again to further delete data of one cluster. Thereafter, at the time when data of one cluster are stocked, data of two clusters containing the data which cannot be recorded are recorded (F104, F105). That is, the execution of the recording operation is delayed until the recording and reproducing apparatus is allowed to perform the recording operation, and the data are collectively recorded. The following methods may be used to detect whether a track jump occurs due to vibration or the like during the recording operation.

One method is that a vibration sensor is provided in the recording and reproducing apparatus, and the system controller detects occurrence of the track jump on the basis of the detection output of the vibration sensor. The other method is that continuity of the address data output from the address decoder 10 is monitored by the system controller and the occurrence of the track jump is detected when discontinuity of the address data is detected by the system controller. Of course, the above methods may be used in combination, and other various methods may be used in place of the above methods.

There is a possibility that the data in the buffer memory 13 overflows because the unrecordable state is kept for a long time, the process goes from step F106 to F107 to discard one-cluster data from old data.

Thereafter, when the recording stop operation is instructed through the operation input unit 19 or from the system controller 11, the process goes from F101 to F108 so that U-TOC data which have been edited and held in an exclusively-used area in accordance with the recording and deleting operation in the buffer memory 13 until that time are written on the disc 1 as new management data of U-TOC to thereby renew the management data of U-TOC, and then the recording operation is finished. Through the above operation, the overwrite recording operation is performed.

As described above, a data portion which is to be deleted and has the same time length of recording data is deleted through the overwrite recording operation while the recording data are recorded on a free area of the magneto-optical disc 1, so that the user can sensitively and easily recognize the portion to be deleted. Therefore, this is convenient for user's use. Furthermore, the processing of trash areas can be easily performed. That is, in the case of the disc system in which continuous data on time axis are discretely recorded on the magneto-optical disc 1, a trash area which is not managed by the U-TOC occurs through the repetitive recording/deleting operation, and thus the recordable time of the disc 1 is reduced by the amount corresponding to the trash area thus formed. In this case, by enrolling the trash area into the free area at the data deletion time, the trash area can be restored without complicated edition or calculation processing.

Furthermore, only the data deletion of one cluster is performed as the edition processing at the recording start time, and thus it is unnecessary to carry out an edition or calculation operation for deleting all the data subsequent to the recording start point. Therefore, the system can be quickly shifted to the actual recording processing.

B. Second Embodiment

<8. Example of Overwrite Recording Operation>

Next, the overwrite recording operation in the second embodiment of the present invention will be described below. The recording and reproducing apparatus and the management mode of the recording data of this embodiment are identical to those of the first embodiment, and the description thereof is omitted.

For example, assuming that the recording operation on the disc is started from the position on the reproduction time axis in the middle of the music data $M_2$, the actual data recording is performed on a free area as shown in FIG. 17B. If the user instructs the stop operation at the time when the data of n clusters are recorded, data of n clusters which has the same data amount or the same time length as the data to be newly recorded are deleted from the position on the reproduction time axis in the middle of the music data $M_2$, and this data-deleted area is set as a free area.

At the time when the recording operation is finished, the newly-recorded data are set as the music data $M_2$ as shown in FIG. 17D. A reproduction time position range corresponding to the time length of the data which have been newly recorded on the free area from the reproduction time corresponding to a position in the middle of the old music data $M_2$ (until the old music data $M_3$) is set as a free area. The remaining portion of the old music data $M_3$ is managed as music data $M_4$ on the U-TOC.

Accordingly, if the recording state of the magneto-optical disc 1 is viewed on the reproduction time axis, the recording state shown in FIG. 18A before the recording operation is performed is changed to the state shown in FIG. 18B after the recording operation. That is, on the reproduction time axis, only the past data at the newly overwritten portion are deleted like the first embodiment.

The second embodiment differs from the first embodiment in that after data are temporarily recorded on a free area, the time position range from a reproduction time position at which the recording operation is instructed is deleted in accordance with the recording time length.

The data deletion is carried out along the direction of the reproduction time position on the magneto-optical disc 1. Accordingly, when a range on which the data deletion is carried out is over plural parts shown in FIGS. 9A to 9D in the first embodiment, a next deletion operation is carried out from a part which is not linked according to its physical order, but linked according to its order on the reproduction time axis, and this is the same as the first embodiment.

<9. Overwrite Record Processing>

Figure 19:
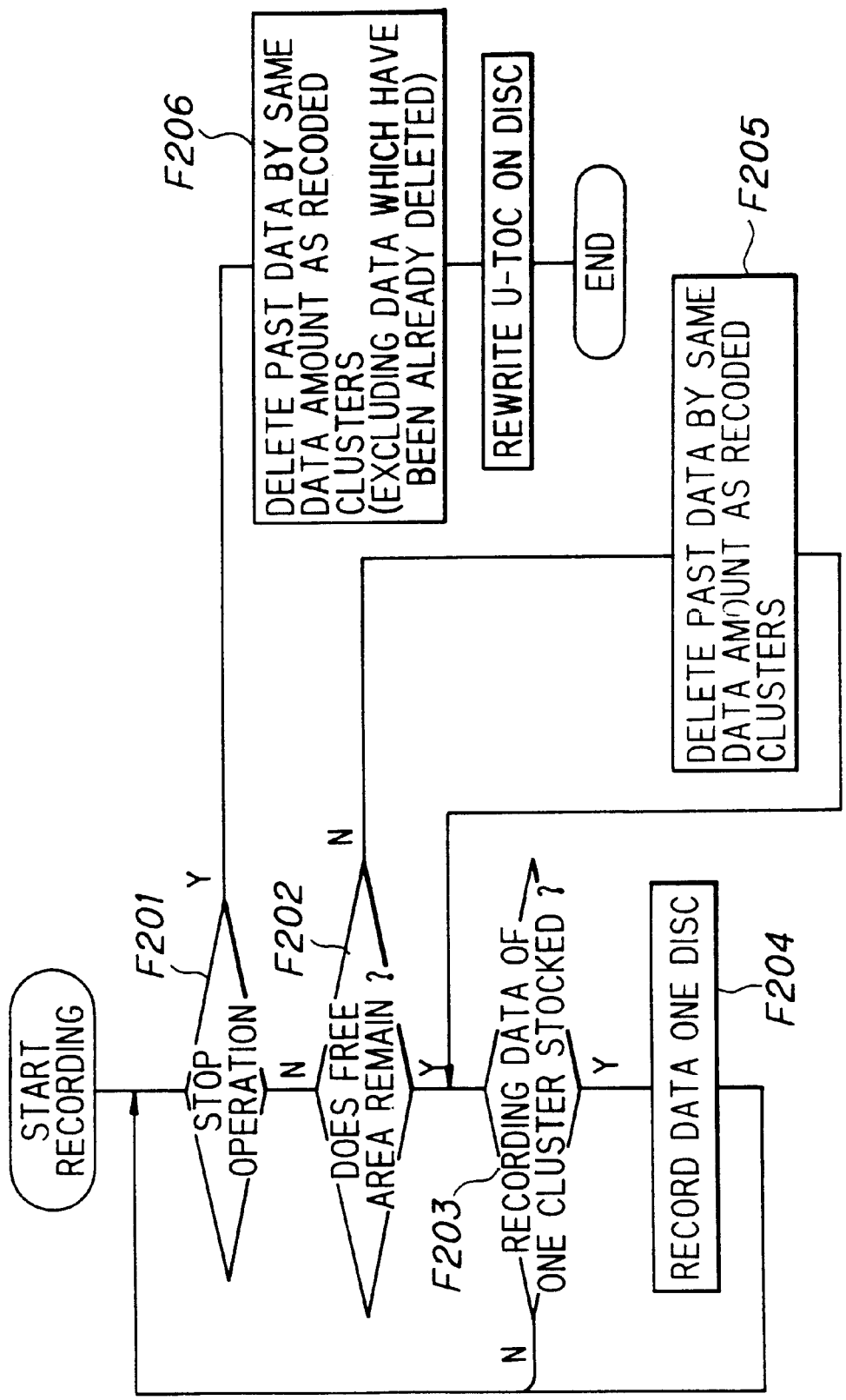
FIG. 19 is a flowchart for the data overwrite recording operation on a disc according to the second embodiment of the present invention.

The processing of the system controller 11 when the overwrite recording operation of the second embodiment will be described with reference to a flowchart of FIG. 19.

When the recording start operation is instructed through the operation input unit 19, the process waits until data of one cluster are stocked in the buffer memory 13 (F203). At the time when the data of one cluster are stocked, the recording operation of data of one cluster on a free area is started (F204). That is, this point is identical to a normal recording processing when no overwrite is carried out, and it corresponds to the operation shown in FIG. 17B. Accordingly, a software for a free-area recording processing with no overwrite is usable.

When the record stop instruction is made through the operation input unit 19 or from the system controller 11, the process goes from steps F201 to F206 and the U-TOC is rewritten to delete the past data having the same time length as the data which are newly recorded on the disc 1 from the reproduction time position on the disc, which is a start point for the recording operation and at which the recording operation is started or instructed. That is, the operation shown in FIG. 17C is executed. Thereafter, the management data of the U-TOC, the edition for which is completed in the exclusively-used area of the buffer memory 13, is written as new U-TOC management data to renew the management data of the U-TOC, and the recording operation is finished. With this operation, the overwrite recording operation as described above is realized.

It would be originally possible because of the overwrite recording operation that data whose time length is larger than the size of a free area existing before the recording operation are recorded by recording data on a data-deleted portion. However, in the system of deleting the data after the recording operation as described above, the recording cannot be performed at the time when the free area existing before the recording operation is completely used. This is because the data on the overwrite portion are not deleted.

Accordingly, when it is judged that the recording operation cannot be performed because the free area is completely used, the past data whose data amount corresponds to the clusters of the new data which have been recorded until this time are deleted in the time position direction from the reproduction time position (start point) when the recording start operation on the magneto-optical disc 1 is carried out, thereby forming a free area (F202, F205). Of course, when this processing is carried out, as the data deletion processing of step F206, the data are deleted by the amount corresponding to the time length of the data which have been newly recorded after the deletion operation of step F205 until the end of the recording operation are deleted from the reproduction time position (start point) just subsequent to the deleted range of step F205. Therefore, it is needless to say that the amount of the newly-recorded data is equal to that of the deleted data in view of the total data amount in the recording operation. Therefore, the second embodiment has the same effect as the first embodiment.

In the embodiments as described above, the recording and reproducing apparatus using the disc-shaped recording medium is representatively used. However, the effect of this invention can be obtained for an apparatus exclusively used for recording. Furthermore, this invention is not limited to the recording apparatus using the disc-shaped recording medium, and a recording apparatus using another type of disc or a tape as a recording medium may be used.

What is claimed is:

1. A recording apparatus for a recording medium which has a data recording area on which a data recording and/or reproducing operation is carried out, and a management data area on which management data for managing a recording and/or reproducing operation for the recording medium are recorded, and on which address data are recorded, the data being discretely recorded on the data recording area while sectioned into plural blocks, each of which has a predetermined data amount as a data recording unit, and data representing the read-out order of the plural blocks being recorded on the management data area, said apparatus comprising:

recording means for recording data on the recording medium;

storing means for temporarily storing the input data to be recorded on the recording medium;

encoder means for encoding data read out from said storing means into recording data and supplying the encoded data to said recording means; and control means for controlling the operation of said recording means, said storing means and said encoder means, wherein when new data are to be recorded on the recording medium, the control means controls the recording means to access, on the basis of the management data which are recorded on the management data area, a free data recordable area in which the new data can be recorded, to record the new data to the free data recordable area the recording means has accessed, to measure the amount of the new data to be recorded on the recordable area, and after the new data has been recorded in the free recordable area, to rewrite the management data to indicate deletion of the already-recorded data on the recording medium in an amount equal to that of the new data recorded on the free data recordable area.

2. The recording apparatus as claimed in claim 1, said apparatus further comprising:

memory control means for controlling the write-in and/or read-out operation of said storing means so that the data are read out from said storing means at a read-out transfer rate which is higher than a write-in transfer rate of data to be recorded on the recording medium, said memory control means controlling the read-out of the data from said storing means on the basis of a control signal from said control means.

3. The recording apparatus as claimed in claim 2, wherein said control means rewrites the management data on the recording medium on the basis of an arrangement state of data on the recording medium after the recording operation of said recording means is completed.

4. The recording apparatus as claimed in claim 3, wherein the arrangement state of data comprises:

a reproduction time axis.

5. The recording method as claimed in claim 3 wherein the arrangement state of data is a reproduction time axis.

* * * * *